United States Patent
Bonsignore et al.

(10) Patent No.: US 11,875,522 B2
(45) Date of Patent: Jan. 16, 2024

(54) METHOD AND DEVICES FOR DETERMINING A FILLING LEVEL IN AT LEAST ONE STORAGE UNIT

(71) Applicant: trinamix GmbH, Ludwigshafen am Rhein (DE)

(72) Inventors: Christian Bonsignore, Ludwigshafen (DE); Christian Schildknecht, Ludwigshafen (DE); Peter Schillen, Ludwigshafen (DE); Patrick Schindler, Ludwigshafen (DE); Edgar Matevosjan, Ludwigshafen (DE); Christoph Lungenschmied, Ludwigshafen (DE); Robert Send, Ludwigshafen (DE); Ingmar Bruder, Ludwigshafen (DE)

(73) Assignee: TRINAMIX GMBH, Ludwigshafen am Rhein (DE)

(*) Notice: Subject to any disclaimer, the term of this patent is extended or adjusted under 35 U.S.C. 154(b) by 667 days.

(21) Appl. No.: 17/050,899

(22) PCT Filed: May 8, 2019

(86) PCT No.: PCT/EP2019/061829
§ 371 (c)(1),
(2) Date: Oct. 27, 2020

(87) PCT Pub. No.: WO2019/215237
PCT Pub. Date: Nov. 14, 2019

(65) Prior Publication Data
US 2021/0326593 A1    Oct. 21, 2021

(30) Foreign Application Priority Data

May 9, 2018  (EP) .................................. 18171413

(51) Int. Cl.
*G06T 7/586* (2017.01)
*G01S 17/89* (2020.01)

(52) U.S. Cl.
CPC ............... *G06T 7/586* (2017.01); *G01S 17/89* (2013.01); *G06F 2218/02* (2023.01); *G06F 2218/08* (2023.01)

(58) Field of Classification Search
CPC .................................. G06T 7/586; G01S 17/89
See application file for complete search history.

(56) References Cited

U.S. PATENT DOCUMENTS

| | | |
|---|---|---|
| 2010/0332051 A1 | 12/2010 | Kormann |
| 2011/0061726 A1 | 3/2011 | Madsen et al. |
| 2012/0314059 A1 | 12/2012 | Hoffmann et al. |

FOREIGN PATENT DOCUMENTS

| | | |
|---|---|---|
| EP | 2020174 A1 | 2/2009 |
| EP | 2301318 A1 | 3/2011 |

(Continued)

OTHER PUBLICATIONS

International Search Report and Written Opinion for corresponding PCT/EP2019/061829, dated Jun. 18, 2019, 10 pages.

(Continued)

*Primary Examiner* — Sam Bhattacharya
(74) *Attorney, Agent, or Firm* — Armstrong Teasdale LLP

(57) ABSTRACT

Described herein is a method for determining a filling level in at least one storage unit. The method includes
illuminating the storage unit with at least one illumination pattern;
selecting at least one first reflection feature and at least one second reflection feature;
for the first reflection feature, generating at least two first sensor signals, and for the second reflection feature, generating at least two second sensor signals;

(Continued)

evaluating the two first sensor signals and the two second sensor signals;

determining at least one position of the first reflection feature and at least one position of the second reflection feature and determining at least one first vector of the first reflection feature and at least one second vector of the second reflection feature; and determining from the first vector and the second vector at least one elevation map and determining therefrom the filling level in the storage unit.

22 Claims, 6 Drawing Sheets

(56) References Cited

FOREIGN PATENT DOCUMENTS

| EP | 3192345 A1 | 7/2017 |
|---|---|---|
| JP | H07242337 A | 9/1995 |
| JP | H11201718 A | 7/1999 |
| JP | 2012047830 A | 3/2012 |
| WO | 2012019734 A1 | 2/2012 |
| WO | 2012110924 A1 | 8/2012 |
| WO | 2014097181 A1 | 6/2014 |
| WO | 2014198629 A1 | 12/2014 |

OTHER PUBLICATIONS

R.A. Street (Ed.): Technology and Applications of Amorphous Silicon, Springer-Verlag Heidelberg, 2010, pp. 346-349.

X. Jiang, H. Bunke: "Dreidimensionales Computersehen" Springer, Berlin Hei-delberg, 1997, chapter 2 (No English translation available).

A

B

C

METHOD AND DEVICES FOR DETERMINING A FILLING LEVEL IN AT LEAST ONE STORAGE UNIT

CROSS-REFERENCE TO RELATED APPLICATIONS

This application is a U.S. National Phase Application of International Patent Application No. PCT/EP2019/061829, filed on May 8, 2019, which claims the benefit of priority to European Patent Application Number 18171413.0, filed May 9, 2018, the entire contents of which are hereby incorporated by reference herein.

FIELD OF THE INVENTION

The invention relates to a filling level determining device, a storage unit for storing an amount of articles, a method for determining a filling level in at least one storage unit, a method for determining a change of an amount of articles in at least one storage unit and a method for determining an amount of articles in at least one warehouse comprising a plurality of storage units.

Prior Art

In professional purchase processes building components of a product are often categorized into "A", "B" and "C" components. "A" components may be considered to contribute essentially (~75%) to a value of the product but only a small quantity of "A" components may be required in the product. "B" components may be considered to contribute to 10 to 20% to the value of the product but a higher quantity (10-40%) of "B" components may be required in the product. "C" components may contribute not significantly (5-10%) to the value of the product but a high quantity of "C" components may be required. "C" components may be bulk goods such as screws, nuts and other low price bulk goods. Often ordering effort of "C" components is higher than the material value such that logistics and management of "C" components is a challenge. Optimizing and automatizing of management of "C" components have a high value creation potential.

"C" components may be stored in fully automatic distribution centers. For distribution of "C" components and for "C" component customers it is a challenge to ensure that the warehouse is filled sufficiently and at the same time a low amount of assets is captured. Thus, it is a technical challenge of C-component-management to determine a filling level of a storage unit storing the "C" components, in particular independent from material, shape, color and size of the stored "C" components and independent of material, shape, color and size of the storage unit. Specifically it is desirable to equip each storage unit of the warehouse with a measurement device adapted to determine the filling level such that low cost measurement devices are required. Furthermore, simple data handling and consumption based delivery in real time is desirable.

Methods for determining the filling level are generally known. For example, WO 2012/019734 a1 describes a container for transporting and/or storing objects. Such a container comprises a detection device, in order to determine information about the holding condition and/or the fill level of the container. The detection device is able to detect differing light intensities in the region of the inner walls of the container and to generate corresponding sensor signals. Furthermore, an interface for connecting to a signal processing device is provided, in which image information about the fill level and/or holding condition of the container is generated on the basis of the sensor signals.

US 2012/0314059 A1 describes detecting the fill level of a container for transporting and/or storing objects. It is described to determine an estimate of the number of objects in the container with the aid of a value of the container volume occupied by the objects or the already emptied container volume, on the basis of an average object volume of one or of a predetermined number of the objects, as long as the container bottom is covered by objects situated in the container. When a predetermined portion of the container bottom is visible, the objects in the container are counted, by identifying the individual objects on the container bottom.

EP 2 020 174 A1 describes an agricultural working machine, in particular a forage harvester, with at least one spout for conveying received and processed crop to a transport vehicle, wherein an electro-optical device is provided for the direction control of the spout at least during the process of conveying to the transport vehicle, and wherein the electro-optical device detects characteristic parameters of the spout and characteristic parameters of the transport vehicle and/or the agricultural working machine.

For example, the filling level may be determined by measuring the weight of the storage unit. However, known methods may be not sufficiently precise, in particular in case of varying articles, for example, articles made of paper and made of stainless steel. Furthermore, known methods may have problems in determining the filling level of the last 10% in the storage unit which are significantly important to ensure that the warehouse is filled sufficiently and at the same time a low amount of assets is captured.

Problem Addressed by the Invention

It is therefore an object of the present invention to provide devices and methods facing the above-mentioned technical challenges of known devices and methods. Specifically, it is an object of the present invention to provide devices and methods which reliably may determine a filling level of a storage unit, preferably with low requirements in terms of technical resources and costs, and preferably independent of material, shape, color and size of the storage unit and of stored articles.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention a method for determining a filling level in at least one storage unit is disclosed.

As used herein, the term "at least one storage unit" refers to an arbitrarily shaped device adapted to store and/or host at least one article. The storage unit comprises at least one receptacle adapted to receive and to store the articles. The receptacle may comprise at least one bottom surface or ground surface and at least one side wall adapted to at least partially surround the bottom surface or ground surface. The term "partially surround" refers to that embodiments are possible wherein the side walls of the storage unit are open at at least one side. However, other embodiments are possible. A bottom surface of the storage unit and the wall may not be connected, for example, as in a pallet with barrels, wherein the barrels may be fixed with at least one plastics foil. Embodiments without a wall are feasible, e.g. a pallet. In embodiments without a wall a maximum filling height may be determined from additional or other information such as maximum weight, center of gravity or the like. Items comprised by the storage unit may be fixed by a mounting device: fastener, tape, wrap, foil, belts, or the like. The storage unit may comprise at least one lid adapted to at least partially cover the storage unit. The storage unit may be selected from the group consisting of: at least one container; at least one box; at least one bucket, at least one vessel, at least one barrel, at least one bottle, at least one ampoule, at least one antistatic bag, at least one bag-in-box, at least one cage, at least one flexible bag or bottle, at least one case, at least one carboy, at least one carton, at least one chub, at least one clamshell, at least one crate, at least one cup, at least one envelope, at least one jar, at least one jerrycan, at least one keg, at least one multi-pack, at least one pail, at least one paper or plastic bag, at least one paper sack, at least one retort pouch, at least one Tetra Brik, at least one tub, at least one tube, at least one unit load, at least one vial, at least one wooden box, at least one blister pack, at least one container, at least one pallet, at least one bulk box, at least one pallet box, at least one bin box, at least one intermediate bulk container, at least one flexible intermediate bulk container, at least one intermodal container, at least one drum, at least one cask, at least one can, at least one bag. For example, the storage unit may be a silo or a warehouse. The storage unit may have an arbitrary shape such as a rectangular, cubic, circular, octagonal, hexagonal, cylindrical shape or the like. The storage unit may be made from or may comprise materials such as wood, plastic, steel, metal, paper, silicon, silicone, fiber, carton, aluminum, iron, glass, metal foil, plastic film, cellophane, bubble wrap, coated paper, fiberboard, nickel, carbon, lead, copper, tungsten, titanium, cardboard, paperboard, magnesium, polymer foam, metallized film, liquid packaging board, concrete, cement, tin, zinc, stretch wrap, tape, molded pulp, fabric, zinc, bricks, plaster, clay, sand, or the like. For example, the storage unit may comprise at least one plastic container. Other shapes and materials are possible. The storage unit may have a size suitable to store a desired amount of articles.

As used herein, the term "filling level" refers to a level of articles within the storage unit. As used herein, the term "article" refers to components to be stored within the storage unit. The articles may have an arbitrary shape such as circular shape, cubic, circular, octagonal, hexagonal, ring-shape, rectangular shape, or the like. However, other shapes are possible. The articles may be made from or may comprise materials selected from the group consisting of wood, plastic, steel, rubber, paper, metal, fiber, silicon, silicone, carton, aluminum, iron, glass, metal foil, plastic film, cellophane, bubble wrap, coated paper, fiberboard, nickel, carbon, lead, copper, tungsten, titanium, cardboard, paperboard, magnesium, polymer foam, metallized film, liquid packaging board, concrete, cement, tin, zinc, stretch wrap, tape, molded pulp, fabric, zinc, bricks, plaster, clay, sand, or other materials. The articles may have arbitrary size and/or cross sections. For example, the size of an article may be from 0.001 m to 0.5 m. The articles may be solid components, non-solid components, liquid components, non-liquid components or mixtures of solid and/or liquid and/or non-solid and/or non-liquid components. For example, the articles may comprise bulk material. The bulk material may be material in a pourable form. The articles may be selected from the group consisting of: building materials such as sand, earth, peat, humus, gravel, cement; chemical materials; heating materials such as wax, garbage, waist, coal, wood, pellets, oil, kerosene, liquified gas, or the like; commodities such as pens, pencils, rubbers, screws, nuts, dowels, snap rings, bolts, or the like; covers; packagings such as paper, foils, wraps, bubble wrap, polymer foam, tinsel or the like; powdery goods such as pigments, fertilizer or the like; liquids, dispersions, paints, pastest or the like; small-parts or small items; consumables such as batteries, electronic parts e.g. LEDs, resistors, capacitors or the like, printed circuit boards, gloves, bottles; fluids; fluidized solids; granulate foods such as grains, cereals, sugar, salt, coffee, flour or the like. The filling level may be essentially constant in the storage unit, in particular essentially horizontal, specifically in case of fluids or liquids, wherein divergences from a constant filling level within 20%, preferably 15% are possible. The filling level may be non constant, in particular in case of piece goods. The filling level may comprise a plurality of minimum and/or maximum values, for example at least one peak value. The filling level may be a measure for an amount of articles in the storage unit.

The method comprises the following steps
a) illuminating the storage unit with at least one illumination pattern comprising a plurality of illumination features and determining at least one reflection image of the storage unit;
b) selecting at least one first reflection feature and at least one second reflection feature of the reflection image;

c) for the first reflection feature, generating at least two first sensor signals in response to an illumination of at least one sensor element having a matrix of optical sensors by the first reflection feature, and for the second reflection feature, generating at least two second sensor signals in response to an illumination of the sensor element by the second reflection feature, the optical sensors each having a light-sensitive area;

d) evaluating the two first sensor signals generated in step c), thereby, determining at least one first longitudinal coordinate z1 of the first reflection feature, and evaluating the two second sensor signals generated in step c), thereby, determining at least one second longitudinal coordinate z2 of the second reflection feature;

e) determining at least one position (x1, y1) of the first reflection feature and at least one position (x2, y2) of the second reflection feature in the reflection image and determining at least one first vector (x1, y1, z1) of the first reflection feature and at least one second vector (x2, y2, z2) of the second reflection feature;

f) determining from the first vector and the second vector at least one elevation map and determining therefrom the filling level in the storage unit.

The method steps may be performed in the given order or may be performed in a different order. Further, one or more additional method steps may be present which are not listed. Further, one, more than one or even all of the method steps may be performed repeatedly. The method may be performed fully automatic.

As used herein, the term "pattern" refers to an arbitrary known or pre-determined arrangement comprising at least one arbitrarily shaped feature. The pattern may comprise at least one feature such as a point or symbol. The pattern may comprise a plurality of features. The pattern may comprise an arrangement of periodic or non-periodic features. As used herein, the term "illumination pattern" refers to a pattern which illuminates the storage unit. The illumination pattern may be generated by ambient light, such as by at least one ambient light source, or by at least one illumination device. The illumination pattern may comprise at least one pattern selected from the group consisting of: at least one point pattern, in particular a pseudo-random point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. For example, the illumination pattern may be generated by at least one illumination device comprising at least one illumination source. Specifically, the illumination source may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. For example, the illumination source may comprise at least one super luminescent diode (SLD). The illumination device may comprise one or more diffractive optical elements (DOEs) adapted to generate the illumination pattern. For example, the illumination device may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern may comprise a maximum number of features per area such that a hexagonal pattern may be preferred. A distance between two features of the illumination pattern and/or an area of the at least one illumination feature may depend on the circle of confusion in the image and/or on an actual size of the light spot. Additionally or alternatively, the illumination pattern may be generated by at least one ambient light source.

The illumination of the object may be performed from more than one perspective and/or with non-patterned light source from more than one perspective.

The illumination device and the sensor element may be configured such that the illumination pattern propagates from the illumination source, in particular from at least one opening of at least one housing of the illumination source, towards the storage unit along and/or parallel to an optical axis of the sensor element and/or the illumination device. For this purpose, at least one reflective element may be used, preferably at least one prism, for deflecting the illumination pattern such that it propagates along or parallel to the optical axis.

The illumination device may be arranged such that the storage unit may be maximally illuminated, i.e. that a suitable distribution of features of the illumination pattern is achieved. This may allow to reduce a dead volume, i.e. a region which is shadowed due to of the illumination device and the sensor element.

The illumination device may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination device may comprise at least one light source adapted to generate the illumination pattern directly. For example, the illumination device may comprise at least one laser source. For example, the illumination device may comprise at least one line laser. The line laser may be adapted to send a laser line to the storage unit, for example a horizontal or vertical laser line. The illumination device may comprise a plurality of line lasers. For example, the illumination device may comprise at least two line lasers which may be arranged such that the illumination pattern comprises at least two parallel or crossing lines. The illumination device may comprise the at least one light projector adapted to generate a cloud of points such that the illumination pattern may comprise a plurality of point pattern. The illumination device may comprise at least one mask adapted to generate the illumination pattern from at least one light beam generated by the illumination source. The illumination device may be one of attached to or integrated into a mobile device such as a smartphone. The illumination device may be used for further functions that may be used in determining an image such as for an autofocus function. The illumination device may be attached to a mobile device such as by using a connector such as a USB- or phone-connector such as the headphone jack.

The illumination device, specifically, may be configured for emitting light in the visible or infrared spectral range. It shall be noted, however, that other spectral ranges are feasible, additionally or alternatively. Further, the illumination device specifically may be configured for emitting modulated or non-modulated light. In case a plurality of illumination sources is used, the different illumination sources may have different modulation frequencies which, as outlined in further detail below, later on may be used for distinguishing the light beams, or may have different spectral ranges. As will be outlined in detail below, the evaluating of the reflection image and of the sensor signals may be performed using at least one evaluation device. The evaluation device may be configured for evaluating a single light beam or a plurality of light beams. In case a plurality of light beams propagates from the storage unit to the sensor element, means for distinguishing the light beams may be provided. Thus, the light beams may have different spectral properties, and one or more wavelength selective elements may be used for distinguishing the different light beams. Each of the light beams may then be evaluated independently. The wavelength selective element may be or may be part of the CMOS sensor, which may be adapted to separate RGB wavelengths and/or IR. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device may be configured for distinguishing different light beams having different modulations.

As used herein, the term "illuminating the storage unit with at least one illumination pattern" refers to applying the illumination pattern to the storage unit, in particular to a surface of the articles to be measured and/or to a ground of an empty storage unit.

As used herein, the term "reflection image" refers to an image determined by the optical sensor and/or at least one imaging device and comprising at least one reflection feature. The storage unit, in particular articles in the storage unit, may emit and/or reflect at least one light beam of the illumination pattern. As used herein, the term "reflection feature" refers to a feature in an image plane generated by the storage unit in response to illumination, for example with at least one illumination feature. The reflection image may comprise the at least one reflection pattern comprising the at least one reflection feature. As used herein, the term "determining at least one reflection image" refers to one or more of imaging, recording and generating of the reflection image.

The reflection image may comprise a plurality of reflection features. The evaluation device may be adapted to determine the reflection beam profile of the reflection feature. As used herein, the term "determining at least one reflection beam profile of the reflection feature" refers to identifying at least one reflection feature provided by the optical sensor and/or selecting at least one reflection feature provided by the optical sensor and evaluating at least one intensity distribution of the reflection feature. As an example, a region of the matrix may be used and evaluated for determining the intensity distribution, such as a three-dimensional intensity distribution or a two-dimensional intensity distribution, such as along an axis or line through the matrix. As an example, a center of illumination by the light beam may be determined, such as by determining the at least one pixel having the highest illumination, and a cross-sectional axis may be chosen through the center of illumination. The intensity distribution may be an intensity distribution as a function of a coordinate along this cross-sectional axis through the center of illumination. Other evaluation algorithms are feasible. The evaluation device may be adapted to select the at least one first reflection feature and the at least one second reflection feature. As used herein, the term "select at least one reflection feature" refers to one or more of identifying, determining and choosing at least one reflection feature of the reflection image. The evaluation device may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an images created by the reflection pattern at different illumination times; a formation of a difference image between an image created by the reflection pattern and an image created without illumination; a formation of a difference image between an image created by the reflection pattern and an image created with ambient illumination; a formation of a difference image between an image created by the reflection pattern and at least one further image; a formation of a difference image between an image created by the reflection pattern and an image created by the reflection pattern from a further illumination source; a formation of a difference image between an image created by the reflection pattern and at least one offset; an inversion of the image by inverting an image created by the reflection pattern; a formation of a difference image between images created by the reflection pattern at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. At least one region of interest may be determined manually by a user or may be determined automatically, such as by recognizing a feature within the reflection image.

The evaluation device may be adapted for evaluating the reflection beam profile. As used herein, the term "evaluating the reflection beam profile" refers to analysis of the reflection profile comprising at least one mathematical operation and/or at least one comparison and/or at least symmetrizing and/or at least one filtering and/or at least one normalizing. For example, the evaluation of the reflection beam profile may comprise at least one of a histogram analysis step, a calculation of a difference measure, application of a neural network, application of a machine learning algorithm. The evaluation device may be adapted to symmetrize and/or to normalize and/or to filter the reflection beam profile, in particular to remove noise or asymmetries from recording under larger angles, recording edges or the like. The evaluation device may filter the reflection beam profile by removing high spatial frequencies such as by spatial frequency analysis and/or median filtering or the like. Summarization may be performed by center of intensity of the light spot and averaging all intensities at the same distance to the center. The evaluation device may be adapted to normalize the reflection beam profile to a maximum intensity, in particular to account for intensity differences due to the recorded distance. The evaluation device may be adapted to remove influences from background light from the reflection beam profile, for example, by an imaging without further illumination.

The reflection feature may cover or may extend over at least one pixel. For example, the reflection feature may cover or may extend over plurality of pixels. The evaluation device may be adapted to determine and/or to select all pixels connected to and/or belonging to the reflection feature, e.g. a light spot. The evaluation device may be adapted to determine the center of intensity and by $$R_{coi} = \frac{1}{l \cdot \Sigma j \cdot r_{pixel}},$$

wherein $R_{coi}$ is a position of center of intensity, $r_{pixel}$ is the pixel position and $l=\Sigma_j I_{total}$ with j being the number of pixels j connected to and/or belonging to the reflection feature and $I_{total}$ being the total intensity.

For determining the at least one longitudinal coordinate of the object, the evaluation device may simply use a predetermined relationship between the intensity distribution and the longitudinal coordinate and/or may apply one or more evaluation algorithms. Specifically, the evaluation device may be adapted to determine at least one intensity distribution function approximating the intensity distribution. As used herein, an intensity distribution function generally is a mathematical function, such as a two-dimensional function f(x) or a three-dimensional function f(x, y), which approximates the actual intensity distribution of the at least one optical sensor and/or a part thereof. Thus, the intensity distribution function may be a fit function derived by applying one or more well-known fitting or approximation algorithms, such as a regression analysis like least squares fit or others. These fitting algorithms generally are known to the skilled person. As an example, one or more predetermined fitting functions may be given, with one or more parameters, wherein the parameter is chosen such that a best fit to the intensity distribution is achieved.

As outlined above, the intensity distribution function may approximate the full intensity distribution or a part thereof. Thus, as an example, a region of the matrix may be used and evaluated for determining the intensity distribution function, such as a three-dimensional intensity distribution function f(x, y). Additionally or alternatively, a two-dimensional intensity distribution function f(x) may be used, such as along an axis or line through the matrix. As an example, a center of illumination by the light beam may be determined, such as by determining the at least one pixel having the highest illumination, and a cross-sectional axis may be chosen through the center of illumination. The intensity distribution function may be a function of a coordinate along this cross-sectional axis through the center of illumination, thereby deriving a two-dimensional intensity distribution function. Other evaluation algorithms are feasible.

As outlined above, the evaluation device is adapted to determine the longitudinal coordinate of the object by using a predetermined relationship between a longitudinal coordinate and the intensity distribution function. Additionally or alternatively, specifically in case one or more intensity distribution functions are fitted to the actual intensity distribution, at least one parameter derived from the intensity distribution function may be determined, and the longitudinal coordinate of the object may be determined by using a predetermined relationship between the at least one parameter, such as the at least one fit parameter, and the longitudinal coordinate of the object, such as the distance between the object and the detector.

Further embodiments relate to the nature of the at least one intensity distribution function. Specifically, the intensity distribution function may be a function describing a shape of the at least one light beam, in the following also referred to as a beam shape. Thus, generally, the intensity distribution function may be or may comprise a beam shape function of the light beam. As used herein, a beam shape function generally refers to a mathematical function describing a spatial distribution of an electric field and/or of an intensity of a light beam. As an example, a beam shape function may be a function describing an intensity of a light beam in a plane perpendicular to an axis of propagation of the light beam, wherein, optionally, a position along the axis of propagation may be an additional coordinate. Therein, generally, arbitrary types of coordinate systems may be used for describing the spatial distribution of the electric field and/or the intensity. Preferably, however, a coordinate system is used which comprises position in a plane perpendicular to an optical axis of the detector.

As outlined above, the intensity distribution function comprises a two-dimensional or a three-dimensional mathematical function approximating an intensity information contained within at least part of the pixels of the optical sensor. Thus, as further outlined above, one or more fitting algorithms may be used for determining the at least one intensity distribution function, preferably in at least one plane parallel to the at least one optical sensor. The two-dimensional or three-dimensional mathematical function specifically may be a function of at least one pixel coordinate of the matrix of pixels. Additionally or alternatively, as outlined above, other coordinates may be used, such as one or more coordinates along one or more lines or axes in a plane of the at least one optical sensor, such as along a cross-sectional line through a maximum of intensity of the light beam on the at least one optical sensor. Thus, specifically, the at least one intensity distribution function may be a cross-sectional intensity distribution function describing an intensity distribution through a center of illumination.

As outlined above, the intensity distribution function generally may be an arbitrary function which typically occurs when a surface is illuminated by a light beam, such as a Gaussian light beam. Therein, one or more fitting parameters may be used for fitting the function to the actual illumination or intensity distribution. As an example, for Gaussian functions, the width $w_0$ and/or the longitudinal coordinate z may be appropriate fitting parameters.

The two-dimensional or three-dimensional mathematical function specifically selected from the group consisting of: a bell-shaped function; a Gaussian distribution function; a Bessel function; a Hermite-Gaussian function; a Laguerre-Gaussian function; a Lorentz distribution function; a binomial distribution function; a Poisson distribution function. Combinations of these and/or other intensity distribution functions may be possible.

As outlined above, the evaluation device specifically may be adapted to determine the longitudinal coordinate of the object by using a predetermined relationship between the beam parameters and the longitudinal coordinate. The predetermined relationship may be or may comprise an analytical relationship such as the known propagation properties of a Gaussian light beam. Additionally or alternatively, other types of predetermined relationships may be used, such as empirical or semi-empirical relationships. Again, additionally or alternatively, the predetermined relationship may be provided as a lookup table, indicating the at least one longitudinal coordinate as a function of the at least one parameter. Various types of evaluation routines are possible and may easily be implemented within the evaluation device.

The evaluation of the intensity distribution in one plane for the evaluation of the intensity distributions in a plurality of planes may be performed in various ways. Thus, as outlined above, various types of intensity distribution functions may be used. As an example, the rotational-symmetric intensity distribution functions may be used which are rotationally symmetric about a center of illumination on the plane. Additionally or alternatively, one or more intensity distribution functions having other types of symmetry may be used such as lower degrees of symmetry. Further, one or more point-symmetric and/or mirror-symmetric intensity distribution functions may be used. Further, combinations of two or more intensity distribution functions may be used, such as combinations of one or more Gaussian functions and one or more polynomials. Further, derivatives of rotationally symmetric functions may be used, and/or products of several functions. Further, at least one intensity distribution function may be used which is a linear combination of two or more functions, such as a linear combination of two or more Gaussian functions having different exponents. Other types of intensity distribution functions may be used. Therein, intensities may be evaluated in various ways. An efficient way of analyzing the intensity distributions, also referred to as images, may be an analysis of edges within the intensity distributions. The analysis of edges within intensity distributions may be performed in addition or alternatively to evaluating beam shapes. Still, the analysis of edges may be preferable, since the analysis of edges generally allows for deducing longitudinal coordinates for objects with little or no structure or contrast. Thus, generally, the detector and the evaluation device may be adapted to determine edges within the at least one intensity distribution or within the plurality of intensity distributions in a plurality of planes, also referred to as the image stack. The development of edges and/or a comparison of the edges within the images of the image stack may allow for deriving an item of longitudinal position information of the object.

In step b), determining of the first reflection features and the second reflection feature may be performed simultaneously by using the same reflection image or non-simultaneously, e.g. by using different reflection images such as reflection images recorded at different times. For example, one of the first reflection feature and the second reflection feature may be determined from a reflection image recorded of the empty storage unit and the other one first reflection feature and the second reflection feature may be determined from a reflection image recorded at a later point in time, e.g. of the filled storage unit.

In method step c), for the first reflection feature, at least two first sensor signals are generated in response to an illumination of at least one sensor element having a matrix of optical sensors by the first reflection feature, and for the second reflection feature, generating at least two second sensor signals in response to an illumination of the sensor element by the second reflection feature. As used herein, the term "sensor element" generally refers to a device or a combination of a plurality of devices configured for sensing at least one parameter. In the present case, the parameter specifically may be an optical parameter, and the sensor element specifically may be an optical sensor element. The sensor element may be formed as a unitary, single device or as a combination of several devices. As further used herein, the term "matrix" generally refers to an arrangement of a plurality of elements in a predetermined geometrical order. The matrix, as will be outlined in further detail below, specifically may be or may comprise a rectangular matrix having one or more rows and one or more columns. The rows and columns specifically may be arranged in a rectangular fashion. It shall be outlined, however, that other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible. The optical sensors of the matrix specifically may be equal in one or more of size, sensitivity and other optical, electrical and mechanical properties. The light-sensitive areas of all optical sensors of the matrix specifically may be located in a common plane, the common plane preferably facing the storage unit, such that a light beam propagating from the storage unit to the sensor element may generate a light spot on the common plane.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination the at least one sensor signal is generated. The light-sensitive area may specifically be located on a surface of the respective optical sensor. Other embodiments, however, are feasible. As used herein, the term "the optical sensors each having at least one light sensitive area" refers to configurations with a plurality of single optical sensors each having one light sensitive area and to configurations with one combined optical sensor having a plurality of light sensitive areas. Thus, the term "optical sensor" furthermore refers to a light-sensitive device configured to generate one output signal, whereas, herein, a light-sensitive device configured to generate two or more output signals, for example at least one CCD and/or CMOS device, is referred to as two or more optical sensors. As will further be outlined in detail below, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the device specifically simple and efficient. Thus, as an example, commercially available photo-sensors, such as commercially available silicon photodiodes, each having precisely one sensitive area, may be used in the set-up. Other embodiments, however, are feasible. Thus, as an example, an optical device comprising two, three, four or more than four light-sensitive areas may be used which is regarded as two, three, four or more than four optical sensors in the context of the present invention. As outlined above, the sensor element comprises a matrix of optical sensors. Thus, as an example, the optical sensors may be part of or constitute a pixelated optical device. As an example, the optical sensors may be part of or constitute at least one CCD and/or CMOS device having a matrix of pixels, each pixel forming a light-sensitive area.

The light-sensitive areas specifically may be oriented towards the storage unit. As used herein, the term "is oriented towards the storage unit" generally refers to the situation that the respective surfaces of the light-sensitive areas are fully or partially visible from the storage unit. Preferably, the light sensitive area may be facing the surface of the box at least partially. More preferably, the light sensitive area may be facing partly a rear wall, partly the surface. Specifically, at least one interconnecting line between at least one point of the storage unit and at least one point of the respective light-sensitive area may form an angle with a surface element of the light-sensitive area which is different from 0°, such as an angle in the range of 20° to 90°, preferably 80 to 90° such as 90°. Thus, when the storage unit is located on the optical axis or close to the optical axis, the light beam propagating from the storage unit towards the sensor element may be essentially parallel to the optical axis. As used herein, the term "essentially perpendicular" refers to the condition of a perpendicular orientation, with a tolerance of e.g. ±20° or less, preferably a tolerance of ±100 or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. The reflection image may comprise at least one light spot generated by the light beam propagating from the storage unit towards the sensor element essentially parallel to the optical axis. Other features of the reflections image, in particular in case of large field of view, may be generated by light beams having a direction of propagation deviating from a parallel direction.

The optical sensors specifically may be or may comprise photodetectors, preferably inorganic photodetectors, more preferably inorganic semiconductor photodetectors, most preferably silicon photodetectors. Specifically, the optical sensors may be sensitive in the visible or infrared spectral range. All of the optical sensors of the matrix or at least a group of the optical sensors of the matrix specifically may be identical. Groups of identical optical sensors of the matrix specifically may be provided for different spectral ranges, or all optical sensors may be identical in terms of spectral sensitivity. Further, the optical sensors may be identical in size and/or with regard to their electronic or optoelectronic properties.

Specifically, the optical sensors may be or may comprise inorganic photodiodes which are sensitive in the visible spectral range or infrared spectral range, preferably in the range of 780 nm to 3.0 micrometers. Using light in the visible spectral range may allow easy adjusting the measuring unit towards the storage unit. Specifically, the optical sensors may be sensitive in the part of the near infrared region where silicon photodiodes are applicable specifically in the range of 700 nm to 1000 nm. Infrared optical sensors which may be used for optical sensors may be commercially available infrared optical sensors, such as infrared optical sensors commercially available from Hamamatsu Photonics Deutschland GmbH, D-82211 Herrsching am Ammersee, Germany. Furthermore, PbS sensors, photoconductive type, as available under brand name Hertzstueck™ by trinamiX™ Ludwigshafen may be used. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one bolometer, preferably a bolometer selected from the group consisting of a VO bolometer and an amorphous Si bolometer.

The matrix may be composed of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip.

Thus, generally, the optical sensors may form a sensor array or may be part of a sensor array, such as the above-mentioned matrix. Thus, as an example, the sensor element may comprise an array of optical sensors, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3 m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±100 or less, more preferably a tolerance of ±5° or less. Thus, as an example, tolerances of less than 20°, specifically less than 100 or even less than 5°, may be acceptable. In order to provide a wide range of view, the matrix specifically may have at least 10 rows, preferably at least 50 rows, more preferably at least 100 rows. Similarly, the matrix may have at least 10 columns, preferably at least 50 columns, more preferably at least 100 columns. The matrix may comprise at least 50 optical sensors, preferably at least 100 optical sensors, more preferably at least 500 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the sensor element may be oriented essentially perpendicular to an optical axis, for example a common optical axis of the illumination device and/or of the image device and/or at least one transfer device. Again, with respect to the term "essentially perpendicular", reference may be made to the definition and the tolerances given above. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

As further used herein, a "sensor signal" generally refers to a signal generated by an optical sensor in response to illumination by a light beam. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the optical sensor or any other element may be adapted to process or preprocess the sensor signal, thereby generating secondary sensor signals, which may also be used as sensor signals, such as preprocessing by filtering or the like.

At least one reflection light beam generated in response to the illumination by the illumination pattern may propagate from the storage unit towards the sensor element and/or imaging device. The reflection light beam may be generated in response to the illumination by the illumination pattern generated by the illumination device, such as by an illumination device directly or indirectly illuminating the storage unit, wherein the illumination, in particular at least one light beam, is reflected or scattered by the storage unit, in particular by articles in the storage unit, and, thereby, the reflection light beam is at least partially directed towards the sensor element and/or the imaging device. The method and devices may be used in active and/or passive illumination scenarios. For example, the at least one illumination device may be adapted to illuminate the storage unit, for example, by directing the illumination pattern towards the storage unit, which reflects the illumination pattern. The illumination device may be or may comprise at least one multiple beam light source. For example, the illumination device may comprise at least one laser source and one or more diffractive optical elements (DOEs). Additionally or alternatively, the methods and devices may use radiation already present in the scene such as from at least one ambient light source.

As used herein, the term "ray" generally refers to a line that is perpendicular to wavefronts of light which points in a direction of energy flow. As used herein, the term "beam" generally refers to a collection of rays. In the following, the terms "ray" and "beam" will be used as synonyms. As further used herein, the term "light beam" generally refers to an amount of light, specifically an amount of light traveling essentially in the same direction, including the possibility of the light beam having a spreading angle or widening angle. The light beam may have a spatial extension. Specifically, the light beam may have a non-Gaussian beam profile. The beam profile may be selected from the group consisting of a trapezoid beam profile; a triangle beam profile; a conical beam profile. The trapezoid beam profile may have a plateau region and at least one edge region. The light beam specifically may be a Gaussian light beam or a linear combination of Gaussian light beams, as will be outlined in further detail below. Other embodiments are feasible, however. At least one transfer device may be used which is configured for one or more of adjusting, defining and determining the beam profile, in particular a shape of the beam profile.

The optical sensors may be sensitive in one or more of the ultraviolet, the visible or the infrared spectral range. Specifically, the optical sensors may be sensitive in the visible spectral range from 500 nm to 780 nm, most preferably at 650 nm to 750 nm or at 690 nm to 700 nm. Specifically, the optical sensors may be sensitive in the near infrared region. Specifically, the optical sensors may be sensitive in the part of the near infrared region where silicon photodiodes are applicable specifically in the range of 700 nm to 1000 nm. The optical sensors, specifically, may be sensitive in the infrared spectral range, specifically in the range of 780 nm to 3.0 micrometers. For example, the optical sensors each, independently, may be or may comprise at least one element selected from the group consisting of a photodiode, a photocell, a photoconductor, a phototransistor or any combination thereof. For example, the optical sensors may be or may comprise at least one element selected from the group consisting of a CCD sensor element, a CMOS sensor element, a photodiode, a photocell, a photoconductor, a phototransistor or any combination thereof. Any other type of photosensitive element may be used. The photosensitive element generally may fully or partially be made of inorganic materials and/or may fully or partially be made of organic materials. Most commonly, as will be outlined in further detail below, one or more photodiodes may be used, such as commercially available photodiodes, e.g. inorganic semiconductor photodiodes.

As used herein, the term "surface of the storage unit" refers in case of a filled storage unit to a surface of the material stored in the storage unit and in case of an empty storage unit to a surface of a ground of a housing of the storage unit. As outlined above, in method step d) the two first sensor signals generated in step c) are evaluated. Thereby, at least one first longitudinal coordinate z1 of the first reflection feature is determined. In addition, the two second sensor signals generated in step c) are evaluated and thereby, at least one second longitudinal coordinate z2 of the second reflection feature is determined. As used herein, the term "longitudinal coordinate of the reflection feature" refers to a distance between the sensor element and a location of reflection of an illumination feature on the surface of the storage unit. Thus, the evaluation device may be adapted to determine the longitudinal coordinate of the respective reflection feature and/or to pre-classify the first reflection feature and the second reflection feature of the reflection image. This allows using illumination patterns comprising regular and/or constant and/or periodic pattern such as a triangular pattern, a rectangular pattern, a hexagonal pattern or a pattern comprising further convex tilings. The illumination pattern may comprise as much as possible features per area such that hexagonal patterns may be preferred. The evaluating may comprise evaluating a first combined signal Q1 from the at least two first sensor signals and a second combined signal Q2 from the at least two second sensor signals.

The evaluation device may be configured for determining at least one longitudinal region of the selected reflection features by evaluating a combined signal Q from the sensor signals. The evaluation device may be adapted to determine the first longitudinal coordinate z1 and the second longitudinal coordinate z2 of the respective selected reflection feature by evaluating the combined signals Q1 and Q2. The evaluation device may be adapted to determine the first longitudinal coordinate z1 within an error interval $\pm\varepsilon_1$ and the second longitudinal coordinate z2 within an error interval $\pm\varepsilon_2$. Errors $\varepsilon_1$ and $\varepsilon_2$ may depend on measurement uncertainty of the optical sensor. For example, the error interval may be ±10%, preferably ±5%, more preferably ±1%.

As used herein, the term "combined signal Q" refers to a signal which is generated by combining at least two sensor signals, in particular by one or more of dividing the sensor signals, dividing multiples of the sensor signals or dividing linear combinations of the sensor signals. The evaluation device may be configured for deriving the combined signal Q by one or more of dividing the sensor signals, dividing multiples of the sensor signals, dividing linear combinations of the sensor signals. The first combined signal Q1 may be derived by one or more of dividing the two first sensor signals, dividing multiples of the two first sensor signals, dividing linear combinations of the two first sensor signals. The second combined signal Q2 may be derived by one or more of dividing the two second sensor signals, dividing multiples of the two second sensor signals, dividing linear combinations of the two second sensor signals. The evaluation device may be configured for using at least one predetermined relationship between the combined signal Q and the longitudinal region for determining the longitudinal region. At least one first predetermined relationship between the first combined signal Q1 and the first longitudinal coordinate z1 may be used for determining the first longitudinal coordinate, and at least one second predetermined relationship between the second combined signal Q2 and the second longitudinal coordinate z2 may be used for determining the second longitudinal coordinate. The first predetermined relationship and the second predetermined relationship may be identical. The evaluation device may be configured for using at least one predetermined relationship between the combined signals Q1 and Q2 and the longitudinal coordinate of the respective longitudinal coordinates z1 and z2. The predetermined relationship may be one or more of an empiric relationship, a semi-empiric relationship and an analytically derived relationship. The evaluation device may comprise at least one data storage unit for storing the predetermined relationship, such as a lookup list or a lookup table.

The combined signals Q1 and Q2 may be determined by using various means. As an example, a software means for deriving a quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element or may fully or partially be embodied independent from the sensor element.

For example, the combined signals Qi, with i=1, 2, are derived by $$Q_i(z_O) = \frac{\int\int_{A_1} E(x, y; z_O)dxdy}{\int\int_{A_2} E(x, y; z_O)dxdy}$$

wherein x and y are transversal coordinates, A1 and A2 are different areas of at least one beam profile of the respective reflection feature at the position of the sensor element, and $E(x,y,z_O)$ denotes the beam profile given at the distance $z_O$ of the storage unit. Area A1 and area A2 may differ. In particular, A1 and A2 are not congruent. Thus, A1 and A2 may differ in one or more of the shape or content. Each of the sensor signals may comprises at least one information of at least one area of the beam profile of the respective reflection feature. As used herein, the term "beam profile" relates to a spatial distribution, in particular in at least one plane perpendicular to the propagation of the light beam, of an intensity of the light beam. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance $L(z_O)$ and beam shape $S(x,y; z_O)$, $E(x,y; z_O)=L\cdot S$. Thus, by deriving the combined signal it may allow determining the longitudinal coordinate independent from luminance. In addition, using the combined signal allows determination of the distance $z_O$ independent from an object size. Thus, the combined signal allows determination of the distance $z_O$ independent from the material properties and/or reflective properties and/or scattering properties of the object to be measured and independent from alterations of the light source such as by manufacturing precision, heat, water, dirt, damages on the lens, or the like.

Each of the first sensor signals may comprise at least one information of at least one area of the beam profile of the first reflection feature. Each of the second sensor signals may comprise at least one information of at least one area of the beam profile of the second reflection feature. As used herein, the term "area of the beam profile" generally refers to an arbitrary region of the beam profile at the position of the sensor element used for determining the combined signal Q. The light-sensitive areas may be arranged such that one of the first sensor signals comprises information of a first area of the beam profile of the first reflection feature and the other one of the first sensor signals comprises information of a second area of the beam profile of the first reflection feature. The first area of the beam profile of the first reflection feature and the second area of the beam profile of the first reflection feature may be one or both of adjacent or overlapping regions. The light-sensitive areas may be arranged such that one of the second sensor signals comprises information of a first area of the beam profile of the second reflection feature and the other one of the second sensor signals comprises information of a second area of the beam profile of the second reflection feature. The second area of the beam profile of the second reflection feature and the second area of the beam profile of the second reflection feature may be one or both of adjacent or overlapping regions. The first area of the respective beam profile and the second area of the respective beam profile may be not congruent in area. The method may comprise determining a first area of the beam profile of the respective reflection feature, in particular a first area of the beam profile of the first reflection feature and a first area of the beam profile of the second reflection feature. The method may comprise determining a second area of the beam profile of the respective reflection feature, in particular a second area of the beam profile of the first reflection feature and a second area of the beam profile of the second reflection feature. The first area of the beam profile of the respective reflection feature may comprise essentially edge information of the beam profile of the respective reflection feature and the second area of the beam profile of the respective reflection feature may comprise essentially center information of the beam profile of the respective reflection feature. The edge information may comprise information relating to a number of photons in the first area of the beam profile of the respective reflection feature and the center information comprises information relating to a number of photons in the second area of the beam profile of the respective reflection feature. The evaluation device may be configured to determine and/or to select the first area of the respective beam profile and the second area of the respective beam profile. The beam profiles of the first reflection feature and of the second reflection feature may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

The evaluation device may be configured to derive the combined signals Q1 and Q2 by one or more of dividing the respective edge information and the respective center information, dividing multiples of the respective edge information and the respective center information, dividing linear combinations of the respective edge information and the respective center information. Thus, essentially, photon ratios may be used as the physical basis of the method.

In one embodiment, the reflection pattern propagating from the storage unit to the sensor element may illuminate the sensor element with at least one pattern comprising at least two feature points. As used herein, the term "feature point" refers to at least one at least partially extended feature of the pattern. The feature point may be selected from the group consisting of: at least one point, at least one line, at least one edge. The pattern may be generated by the storage unit, in particular by articles stored in the storage unit, for example, in response to an illumination by the illumination pattern comprising the at least one pattern. The evaluation device may be adapted to identify a first feature point and a second feature point in the reflection image. For each feature point, A1 may correspond to a full or complete area of the respective feature point on the optical sensors and A2 may be a central area of the respective feature point on the optical sensors. The central area may be a constant value. The central area may be smaller compared to the full area of the feature point. For example, in case of a circular feature point, the central area may have a radius from 0.1 to 0.9 times the full radius of the feature point, preferably from 0.4 to 0.6 times the full radius.

For example, the illumination pattern may comprise at least one line pattern comprising at least two lines. The storage unit may reflect the line pattern. For each line of the pattern, A1 may correspond to an area with a full line width of the line pattern on the optical sensors, in particular on the light sensitive area of the optical sensors. The line pattern on the optical sensors may be widened and/or displaced compared to the line pattern of the illumination pattern such that the line width on the optical sensors is increased. In particular, in case of a matrix of optical sensors, the line width of the line pattern on the optical sensors may change from one column to another column. A2 may be a central area of the line pattern on the optical sensors. The line width of the central area may be a constant value, and may in particular correspond to the line width in the illumination pattern. The central area may have a smaller line width compared to the full line width. For example, the central area may have a line width from 0.1 to 0.9 of the full line width, preferably from 0.4 to 0.6 of the full line width. The line pattern may be segmented on the optical sensors. Each column of the matrix of optical sensors may comprise center information of intensity in the central area of the line pattern and edge information of intensity from regions extending further outwards from the central area to edge regions of the line pattern.

For example, the reflection pattern may comprise at least one point pattern. The point pattern may comprise at least two feature points. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 times the full radius, preferably from 0.4 to 0.6 times the full radius.

The reflection pattern may comprise both point patterns and line patterns. Other embodiments in addition or alternatively to line patterns and point patterns are feasible.

For example, the evaluating of the first sensor signals of the first reflection feature and the evaluating of the second sensor signals of the second reflection feature may comprise
  determining at least one optical sensor having the highest sensor signal and forming at least one center signal;
  evaluating the sensor signals of the optical sensors of the matrix and forming at least one sum signal;
  determining at least one combined signal by combining the center signal and the sum signal; and
  determining the longitudinal region by evaluating the combined signal.

In particular, the evaluation device may be configured for evaluating the first sensor signals of the first reflection feature and the second sensor signals of the second reflection feature each, by
  determining the at least one optical sensor having the highest sensor signal and forming the at least one center signal;
  evaluating the sensor signals of the optical sensors of the matrix and the forming at least one sum signal;
  determining the at least one combined signal by combining the center signal and the sum signal; and
  determining the at least one longitudinal coordinate z of the selected feature by evaluating the combined signal.

Consequently, in accordance with the present invention, the term "center signal" generally refers to the at least one sensor signal comprising essentially center information of the beam profile of the respective reflection feature. For example, the center signal may be the signal of the at least one optical sensor having the highest sensor signal out of the plurality of sensor signals generated by the optical sensors of the entire matrix or of the region of interest within the matrix, wherein the region of interest may be predetermined or determinable within an image, specifically of the reflection image. The region of interest may be a region of the respective reflection feature in the reflection image. As used herein, the term "highest sensor signal" refers to one or both of a local maximum or a maximum in a region of interest. The center signal may arise from a single optical sensor or, as will be outlined in further detail below, from a group of optical sensors, wherein, in the latter case, as an example, the sensor signals of the group of optical sensors may be added up, integrated or averaged, in order to determine the center signal. The group of optical sensors from which the center signal arises may be a group of neighboring optical sensors, such as optical sensors having less than a predetermined distance from the actual optical sensor having the highest sensor signal, or may be a group of optical sensors generating sensor signals being within a predetermined range from the highest sensor signal. The group of optical sensors from which the center signal arises may be chosen as large as possible in order to allow maximum dynamic range. The evaluation device may be adapted to determine the center signal by integration of the plurality of sensor signals, for example the plurality of optical sensors around the optical sensor having the highest sensor signal. For example, the beam profile may be a trapezoid beam profile and the evaluation device may be adapted to determine an integral of the trapezoid, in particular of a plateau of the trapezoid.

As outlined above, the center signal generally may be a single sensor signal, such as a sensor signal from the optical sensor in the center of the light spot, or may be a combination of a plurality of sensor signals, such as a combination of sensor signals arising from optical sensors in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile of the respective reflection feature. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the respective beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be adapted to determine one or both of center information or edge information from at least one slice or cut of the light spot. This may be realized for example by replacing the area integrals in the combined signal Q by a line integral along the slice or cut. For improved accuracy, several slices or cuts through the light spot may be used and averaged. In case of an elliptical spot profile, averaging over several slices or cuts may result in an improved distance information.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the sensor element. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the sensor element. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the location of reflection may be generated. The comparing of the center signal and the sum signal, as an example, may be done by forming the combined signal Q out of the center signal and the sum signal and by using a predetermined or determinable relationship between the longitudinal coordinate and the quotient signal for deriving the longitudinal coordinate.

The use of a matrix of optical sensors provides a plurality of advantages and benefits. Thus, the center of the light spot generated by the light beam on the sensor element, such as on the common plane of the light-sensitive areas of the optical sensors of the matrix of the sensor element, may vary with a transversal position of the reflection feature. By using a matrix of optical sensors, the sensor element according to the present invention may adapt to these changes in conditions and, thus, the evaluation device may determine the center of the light spot simply by comparing the sensor signals. Consequently, the evaluation device may, by itself, choose the center signal and determine the sum signal and, from these two signals, derive a combined signal which contains information on the longitudinal coordinate of the reflection feature. By evaluating the combined signal, the longitudinal coordinate of the reflection feature may, thus, be determined. The use of the matrix of optical sensors, thus, provides a significant flexibility in terms of the position of the reflection feature, specifically in terms of a transversal position of the reflection feature.

The first reflection feature and the second reflection feature may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the reflection light beam of the reflection feature specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination.

The transversal position of the light spot on the matrix of optical sensors, such as the transversal position of the at least one optical sensor generating the sensor signal, may even be used as an additional item of information, from which at least one item of information on a transversal position of the reflection feature may be derived, as e.g. disclosed in WO 2014/198629 A1. Additionally or alternatively, as will be outlined in further detail below, at least one additional transversal detector for, in addition to the at least one longitudinal coordinate, detecting at least one transversal coordinate of the reflection feature.

The evaluation device may be configured to determine the at least one longitudinal coordinate z of the respective reflection feature by using at least one known, determinable or predetermined relationship between the sensor signals. In particular, the evaluation device is configured to determine the at least one coordinate z of the reflection feature by using at least one known, determinable or predetermined relationship between a quotient signal derived from the sensor signals and the longitudinal coordinate.

Raw sensor signals of the optical sensors may be used for evaluation or secondary sensor signals derived thereof. As used herein, the term "secondary sensor signal" generally refers to a signal, such as an electronic signal, more preferably an analogue and/or a digital signal, which is obtained by processing one or more raw signals, such as by filtering, averaging, demodulating or the like. Thus, image processing algorithms may be used for generating secondary sensor signals from the totality of sensor signals of the matrix or from a region of interest within the matrix. Specifically, the evaluation device, may be configured for transforming the sensor signals of the optical sensor, thereby generating secondary optical sensor signals, wherein the evaluation device is configured for evaluating the sensor signals by using the secondary optical sensor signals. The transformation of the sensor signals specifically may comprise at least one transformation selected from the group consisting of: a filtering; a selection of at least one region of interest; a formation of a difference image between an images created by the reflection pattern at different illumination times; a formation of a difference image between an image created by the reflection pattern and an image created without illumination; a formation of a difference image between an image created by the reflection pattern and an image created with ambient illumination; a formation of a difference image between an image created by the reflection pattern and at least one further image; a formation of a difference image between an image created by the reflection pattern and an image created by the reflection pattern from a further illumination source; a formation of a difference image between an image created by the sensor signals and at least one offset; an inversion of sensor signals by inverting an image created by the sensor signals; a formation of a difference image between images created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a low-pass filter; applying a Fourier transformation; applying a Radon-transformation; applying a Hough-transformation; applying a wavelet-transformation; a thresholding; creating a binary image. The region of interest may be determined manually by a user or may be determined automatically, such as by recognizing an object within an image generated by the optical sensors. The evaluation, such as the determination of the longitudinal coordinate, may be performed for the region of interest, only. Other implementations, however, are feasible.

As outlined above, the detection of the center of the light spot, i.e. the detection of the center signal and/or of the at least one optical sensor from which the center signal arises, may be performed fully or partially electronically or fully or partially by using one or more software algorithms. Specifically, the evaluation device may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

As outlined above, the sum signal may be derived from all sensor signals of the matrix, from the sensor signals within a region of interest or from one of these possibilities with the sensor signals arising from the optical sensors contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal. Other options, however, exist.

The summing may be performed fully or partially in software and/or may be performed fully or partially in hardware. A summing is generally possible by purely electronic means which, typically, may easily be implemented, e.g. into the evaluation device. Thus, in the art of electronics, summing devices are generally known for summing two or more electrical signals, both analogue signals and digital signals. Thus, the evaluation device may comprise at least one summing device for forming the sum signal. The summing device may fully or partially be integrated into the sensor element or may fully or partially be embodied independently from the sensor element. The summing device may fully or partially be embodied in one or both of hardware or software.

As outlined above, the comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device may be configured for forming the one or more quotient signals. The evaluation device may further be configured for determining the at least one longitudinal coordinate by evaluating the at least one quotient signal.

The evaluation device specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate of the location of reflection and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the sensor element decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the object, from which the light beam propagates towards the sensor element, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

Thus, generally, the evaluation device may be configured for determining the longitudinal coordinate by evaluating the combined signal Q. This determining may be a one-step process, such as by directly combining the center signal and the sum signal and deriving the longitudinal coordinate thereof, or may be a multiple step process, such as by firstly deriving the combined signal from the center signal and the sum signal and, secondly, by deriving the longitudinal coordinate from the combined signal. Both options, i.e. the option of evaluation steps being separate and independent steps and the option of evaluation steps being fully or partially combined, shall be comprised by the present invention.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining of the combined signal Q and the at least one longitudinal coordinate of the reflection feature, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation, in order to determine the at least one longitudinal coordinate of the location of reflection. Additionally or alternatively, however, the evaluation device may also fully or partially be embodied by hardware.

As outlined above, the sensor element may be adapted to determine the at least one reflection pattern. As used herein, the term "reflection pattern" refers to a response pattern generated by reflection or scattering of light at the surface of the storage unit, in particular generated by the surface of the storage unit in response to illumination by the illumination pattern. As outlined above, the illumination pattern comprises a plurality of illumination features adapted to illuminate the surface of the storage unit. As outlined above, the illumination feature may be generated by ambient light or by the at least one illumination source. The reflection pattern may comprise at least one feature corresponding to at least one feature of the illumination pattern. The reflection pattern may comprise, in comparison to the illumination pattern, at least one distorted pattern, wherein the distortion depends on the distance of the location of reflection of the illumination feature on the surface of the storage unit. The evaluation device may be adapted to select at least one feature of the reflection pattern and to determine the longitudinal coordinate of the selected feature of the reflection pattern by evaluating the combined signal Q from the sensor signals, as described above.

The method comprises determining at least one position (x1, y1) of the first reflection feature and at least one position (x2, y2) of the second reflection feature in the reflection image and determining at least one first vector (x1, y1, z1) of the first reflection feature and at least one second vector (x2, y2, z2) of the second reflection feature. The reflection image may be determined by the sensor element and/or by the at least one additional imaging device. As used herein, the term "position in the reflection image" refers to at least one item of information regarding a location of the reflection feature in the reflection image, in particular in the matrix of optical sensors.

As outlined above, by evaluating the center signal and the sum signal, the evaluation device may be enabled to determine the at least one longitudinal coordinate of the respective reference features, including the option of determining the longitudinal coordinate of the whole storage unit or of one or more parts thereof. In addition, however, other coordinates of the references features, including one or more transversal coordinates and/or rotational coordinates, may be determined, specifically by the evaluation device. Thus, as an example, one or more transversal sensors may be used for determining at least one transversal coordinate of the reference features. As outlined above, the position of the at least one optical sensor from which the center signal arises may provide information on the at least one transversal coordinate of the reflection feature, wherein, as an example, a simple lens equation may be used for optical transformation and for deriving the transversal coordinate. Additionally or alternatively, one or more additional transversal sensors may be used and may be comprised by the filling level determining device. Various transversal sensors are generally known in the art, such as the transversal sensors disclosed in WO 2014/097181 A1 and/or other position-sensitive devices (PSDs), such as quadrant diodes, CCD or CMOS chips or the like. Additionally or alternatively, as an example, at least one filling level determining device according to the present invention may comprise one or more PSDs disclosed in R. A. Street (Ed.): Technology and Applications of Amorphous Silicon, Springer-Verlag Heidelberg, 2010, pp. 346-349. Other embodiments are feasible. These devices may generally also be implemented into the filling level determining device according to the present invention. As an example, a part of the light beam may be split off within the filling level determining device, by at least one beam splitting element. The split-off portion, as an example, may be guided towards a transversal sensor, such as a CCD or CMOS chip or a camera sensor, and a transversal position of a light spot generated by the split-off portion on the transversal sensor may be determined, thereby determining at least one transversal coordinate of the reflection feature. The evaluation device may further be configured to determine at least one transversal coordinate x, y of the reference feature. The evaluation device may be adapted to combine the information of the longitudinal coordinate and the transversal coordinate and to determine the vectors (x, y, z).

The method may further comprise determining at least one distance information of the respective location of reflection of the respective illumination feature by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern. As outlined above, the evaluation device may be adapted to determine the first longitudinal coordinate z1 within an error interval $\pm\varepsilon_1$ and the second longitudinal coordinate z2 within an error interval $\pm\varepsilon_2$. The method may comprise improving the determined longitudinal coordinates z1 and z2, in particular accuracy, by determining the at least one distance information of the respective location of reflection of the respective illumination feature by using triangulation and/or structured light techniques.

The method may further comprise:
  determining for each of the selected reflection features at least one displacement region corresponding to a longitudinal region in at least one reference image comprising a plurality of reference features, wherein the longitudinal region is given by the longitudinal coordinate z of the respective selected reference feature determined in step c) and an error interval $\pm\varepsilon$;
  matching the respective selected reflection feature with at least one reference feature within the displacement region.

For example, the reference image may be an image of the illumination pattern at an image plane at a position of the illumination source. The evaluation device may be adapted to determine the displacement region in the reference image corresponding to the longitudinal region of the selected feature of the reflection pattern. The evaluation device may be adapted to match the selected feature of the reflection pattern with at least one feature of the reference pattern within the displacement region. The illumination source and the sensor element may be separated by a fixed distance.

For example, the filling level determining device may comprise at least two sensor elements each having a matrix of optical sensors. At least one first sensor element and at least one second sensor element may be positioned at different spatial positions. A relative distance between the first sensor element and the second element may be fixed. The at least one first sensor element may be adapted to determine at least one first reflection pattern, in particular at least one first reflection feature, and the at least one second sensor element may be adapted to determine at least one second reflection pattern, in particular at least one second reflection feature. The evaluation device may be adapted to select at least one image determined by the first sensor element or the second sensor element as reflection image and to select at least one image determined by the other one of the first sensor element or the second sensor element as reference image. The evaluation device may be adapted to select the at least one reflection feature in the reflection pattern and to determine the longitudinal region of the selected feature by evaluating the combined signal Q from the sensor signals. The evaluation device may be adapted to determine the displacement region in the reference image corresponding to the longitudinal region of the selected feature of the reflection pattern. The evaluation device may be adapted to match the selected feature of the reflection pattern with at least one feature of the reference pattern within the displacement region. The reference image and the reflection image may be images of the storage unit determined at different illumination times and/or at different lighting conditions.

The evaluation device may be adapted to determine the displacement region in the reference image corresponding to the longitudinal region. As used herein, the term "reference image" refers to an image different from the reflection image which is determined at a different spatial position compared to the reflection image. The reference image may be determined by one or more of recording at least one reference feature, imaging the at least one reference feature, calculating of the reference image. The reference image and the reflection image may be images of the storage unit determined at different spatial positions having a fixed distance. The distance may be a relative distance, also called baseline. The evaluation device may be adapted to determine the at least one reference feature in the at least one reference image corresponding to the at least one reflection feature. As outlined above, the evaluation device may be adapted to perform an image analysis and to identify features of the reflection image. The evaluation device may be adapted to identify at least one reference feature in the reference image having an essentially identical longitudinal coordinate as the selected reflection feature. The term "essentially identical" refers to identical within 10%, preferably 5%, most preferably 1%. The reference feature corresponding to the reflection feature may be determined using epipolar geometry. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image may be images of the storage unit determined at different spatial positions and/or spatial orientations having a fixed distance. The evaluation device may be adapted to determine an epipolar line in the reference image. Relative position of the reference image and reflection image may be known. For example, relative position of the reference image and reflection image may be stored within at least one storage unit of the evaluation device. The evaluation device may be adapted to determine a straight line extending from the selected reflection feature of the reflection image. The straight line may comprise possible features corresponding to the selected feature. The straight line and the baseline span an epipolar plane. As the reference image is determined at a different relative position from the reflection image, the corresponding possible features may be imaged on a straight line, called epipolar line, in the reference image. Thus, a feature of the reference image corresponding to the selected feature of the reflection image lies on the epipolar line.

As used herein, the term "displacement region" refers to a region in the reference image in which the reference feature corresponding to the selected reflection feature may be imaged. Depending on the distance to the location of the reflection of the illumination feature, the reference feature corresponding to the image position of the reflection feature may be displaced within the reference image compared to the image position in the reflection image. The displacement region may comprise only one reference feature. As used herein, the term "reference feature" refers to at least one feature of the reference image. The displacement region may extend along the epipolar line. The evaluation device may be adapted to determine the respective reference feature along the epipolar line corresponding to the longitudinal coordinate z and to determine an extent of the displacement region along the epipolar line corresponding to the error interval $\pm\epsilon$. The evaluation device may be adapted to determine the respective longitudinal coordinate z for the reflection feature and an error interval $\pm\epsilon$ from the combined signal Q to determine the displacement region along the epipolar line corresponding to $z\pm\epsilon$. The evaluation device may be adapted to match the selected reflection feature with at least one reference feature within the displacement region. As used herein, the term "matching" refers to determining and/or evaluating corresponding reference and reflection features. The evaluation device may be adapted to match the selected feature of the reflection image with the reference feature within the displacement region by using at least one evaluation algorithm considering the determined longitudinal coordinate z. The evaluation algorithm may be a linear scaling algorithm.

Preferably, the filling level determining device may be adapted to pre-classify the selected reflection feature using the combined signal Q such that an unambiguous assignment to one reference feature is possible. In particular, illumination features of the illumination pattern may be arranged such that corresponding reference features of the reference image may have a relative distance to each other as large as possible on the epipolar line. The illumination features of the illumination pattern may be arranged such that only few reference features are positioned on the epipolar line. For example, the illumination pattern may comprise at least one hexagonal pattern. Preferably, the illumination pattern may comprise at least one hexagonal pattern, wherein the pattern is rotated relative to the baseline. Preferably, the illumination pattern may comprise at least one displaced hexagonal pattern, wherein individual points of the hexagonal pattern are displaced by a random distance from the regular position, for example orthogonal to the epipolar line of the point. The displacement of the individual points may be smaller than half of the distance between two parallel epipolar lines, preferably smaller than one fourth of the distance between two parallel epipolar lines. The displacement of the individual points may be as such that two points are not displaced above each other.

Furthermore, a displacement of the matched reference feature and the selected reflection feature may be determined. At least one longitudinal information of the matched reference feature may be determined using a predetermined relationship between a longitudinal coordinate and the displacement. The evaluation device may be adapted to determine the displacement of the matched reference feature and the selected reflection feature. As used herein, the term "displacement" refers to the difference between a position in the reference image to a position in the reflection image. The evaluation device may be adapted to determine a longitudinal information of the matched feature using a predetermined relationship between a longitudinal coordinate and the displacement. As used herein, the term "longitudinal information" refers to information relating to the longitudinal coordinate. For example, the longitudinal information may be a distance value. The evaluation device may be adapted to determine the pre-determined relationship by using triangulation methods. In case the position of the selected reflection feature in the reflection image and the position of the matched reference feature and/or relative displacement of the selected reflection feature and the matched reference feature are known, the longitudinal coordinate of the corresponding location of the reflection of the illumination feature may be determined by triangulation. Thus, the evaluation device may be adapted to select, for example subsequent and/or column by column, a reflection feature and to determine for each potential position of the reference feature the corresponding distance value using triangulation. Displacement and corresponding distance value may be stored in at least one storage unit of the evaluation device. The evaluation device may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage unit may be provided, such as for providing one or more look-up tables for storing the predetermined relationship.

Using the combined sensor signal may allow to determine and/or to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a low power and/or low maintenance application.

The method further comprises determining from the first vector and the second vector at least one elevation map and determining therefrom the filling level in the storage unit. As used herein, the term "elevation map" refers to at least one three dimensional map comprising the three dimensional vectors, in particular the first vector and the second vector, of the respective reference features. Therein, surface e.g. of powders or liquids may be assumed as smooth, flat and even. Thus, a single measurement point on the surface may be sufficient. Additional or further measurement points may be used for reducing measurement errors.

The method may comprise applying at least one grid to the elevation map. The method may comprise identifying three dimensional points in the evaluation map which appear to be located outside the storage unit, in particular due to measurement inaccuracies. The method may comprise removing all of these three dimensional points from the elevation map which are determined to be located outside the storage unit. The method may comprise comparing the elevation map with at least one pre-determined elevation map, in particular of the empty storage unit and/or of a filled up storage unit. The method may comprise determining a difference in particular the height difference, between the elevation map and a pre-determined elevation map, resulting in a height difference map. The method may comprise comparing the three-dimensional vectors of each of the reflection features, which was determined to be located in the storage unit, with the corresponding vector of the pre-determined elevation map. In particular, the first vector (x1, y1, z1) is compared to the vector $(x_{ref}, y_{ref}, z_{ref})$ of the pre-determined elevation map. In particular, a difference vector $(x1, y1, z1)-(x_{ref}, y_{ref}, z_{ref})$ may be determined, wherein a height, in particular a height difference, is determined by $|(x1, y1, z1)-(x_{ref}, y_{ref}, z_{ref})|$. The absolute value of the difference vector corresponds to the height used for the elevation map, specifically, if the detector receives light under an angle or for arbitrary coordinate systems. Therein, $x_{ref}, y_{ref}$, and $z_{ref}$ are transversal and the longitudinal coordinate at the position (x1, y1) of the predetermined elevation map. The elevation map and/or the height difference map may be filtered before or after the comparison to a further map, such as with a median filter as explained above or below. The method may comprise determining an actual filling level from the height difference $z1-z_{ref}$ by determining a volume, in particular a volume relative to a pre-determined volume. The volume may be determined by determining an integral of the enclosed area of the height difference. For example, in case of many measurement points are available on the surface and/or the bottom or ground, areas between the measurement points may be interpolated. The areas may be even triangles. However, the measurement points may be interpolated using other even and/or continuous areas. The volume may be determined by determining a volume between surface and bottom or ground. For example, in case a single measurement point is available, a surface may be assumed or estimated, for example a flat and/or continuous and/or even and/or horizontal surface. The volume may be determined by determining a volume under the assumed or estimated surface, e.g. from an edge to the bottom or ground. For example, in case of a plurality of measurement points are available, an area around each measurement point e.g. a horizontal and/or flat and/or continuous and/or even area may be determined. For example, the area surrounding a measurement point may be determined and partitioned using using a tessellation procedure such as Thiessen polygons, Voronoi tessalations, Dirichlet tessalations, or the like. For example, edges of the areas of neighboring measurement points may intersect and/or cut an interconnecting line between measurement points, e.g. in a center of the points. The areas determined by the tessellation procedure may be set parallel to the surface of the empty storage unit, or may be approximated as such that a smooth transition between two adjacent areas is obtained, or the like. Once the area around a measurement point is determined, the volume connected to the measurement point is given as the volume integral below the area.

The pre-determined elevation map may be the elevation map of the empty storage unit or of the filled up storage unit, in particular 100% filled up storage unit. In particular, the determined elevation map may be compared to an elevation map of a 100% filled up storage unit and at least one percentage filling level may be determined. Thus, the determined elevation map may be compared to a 0% or a 100% filled storage unit. The method may comprise detecting an overfill and/or generating a warning in case of overfill, in particular if the determined elevation map is determined to correspond to the 100% filled storage unit and/or exceeds the 100% filled storage unit.

The method may comprise repeating method step a) to e), and in particular to determine a plurality of reflection images comprising the first reflection feature and the second reflection feature. This may allow enhancing reliability of assigning the vector to the respective reflection feature even in presence of reflections, scratches or contamination of the storage unit. Illumination times may be from 0.1 ms to 150 ms. The illumination times may be about 1 ms for surfaces which are bright reflecting and up to 150 ms for matt surfaces or black objects. In case of repeating method steps a) to e) determined vectors of the features of the reflection image may be stored in an array. In a next step, features having the same coordinates may be removed from the array. In particular, coordinates (x, y, z) of each of the features of the array may be compared to coordinates of all other features of the array. If in the array a further feature is found with the same, within a tolerance of ±2 mm, (x, y, z) coordinates this further feature is removed from the array. Alternatively from removing multiple features, a mean or median value of the coordinates of multiple features may be determined.

The determining of the elevation map may comprise at least one smoothing step, wherein outliers may be smoothed with at least one median filter. However, in case of using an illumination pattern comprising only a few illumination features information redundancy is low. Thus, in the smoothing step at least one algorithm may be used which examines if a reflection feature is an outlier considering neighboring reflection features in a 3D-E-region. Outlier may be determined in 2D and/or in 3D. For example, in 3D outliers may be identified as hole or peak in an even surface.

For example, in 2D, outliers may be determined by evaluating if an expected measurement point is present. If the examined reflection feature is determined to be an outlier, the reflection feature may be reconstructed from a median value and/or mean value of the neighboring reflection features.

The method may comprise estimating a filling level using illumination features additionally or only which are located at a wall such as at a rear wall and/or side wall and/or surface and/or bottom or the like of the storage unit and/or at a further wall that may be located in the vicinity of the storage unit during the measurement and which may be used specifically for this purpose. Specifically, the wall may be designed as such that reflection features of the illumination pattern are detectable in a reliable way and/or distinguishable in a reliable way from articles in the storage unit. In particular in case of determining the filling level of articles that are difficult to detect, such as low reflecting articles, highly reflecting articles, metallic articles, mixtures of low and highly reflecting articles or the like, which may lead to low back reflection of the illumination pattern and/or to multiple reflections and/or distorted back reflections or the like, using illumination features which are located at a wall such as the rear wall and/or side wall and/or surface and/or bottom or the like of the storage unit and/or at a further wall that may be located in the vicinity of the storage unit during the measurement and which may be used specifically for this purpose may allow determining an estimate of the filling level. The illumination features located at a wall may be calibrated within an empty-calibration step. Using the illumination features located at a wall in combination with the position of the filling level determining device allows determining the volume that is not occupied by articles. In particular, using the position of the filling level determining device in combination with the positions of the reflection features at a wall, further combined with the fact that the at least one light beam of each reflection feature travels on a straight line towards the detector, i.e. the filling level determining device, further combined with a calibration for a 100% filled up storage unit further combined with the knowledge about the direction of gravitational force such as from an accelerometer or the like may be used to determine the empty volume above the at least one light beam travelling from a reflection feature at a wall to the detector. A difference between the calibration for a 100% filled up storage unit with the empty volume of the storage unit may be a good and reliable approximation for the filling level of the storage unit. Further, in case positions of reflection features from articles and positions from reflection features from a wall may be determined, the above considerations to estimate the empty volume above a light ray may be used only partially and/or locally, e.g. in positions where the determination of a position of a reflection feature was not possible and/or where an outlier as determined. Alternatively or in addition, the empty volume above a light ray may be corrected by the position of a reflection feature of an article determined beneath the same light ray.

The method may comprise at least one empty-calibration step. In the empty-calibration step dimensions of the empty storage unit are determined. The empty calibration step may comprise the following substeps:

i) Illuminating the empty storage unit with the at least one illumination pattern comprising the plurality of illumination features and determining the at least one reflection image of the empty storage unit;

ii) selecting the at least one first reflection feature and the at least one second reflection feature of the reflection image;

iii) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;

iv) evaluating the two first sensor signals generated in step iii) thereby, determining the at least one first longitudinal coordinate z1 of the first reflection feature, and evaluating the two second sensor signals generated in step iii), thereby, determining the at least one second longitudinal coordinate z2 of the second reflection feature, wherein the evaluating comprises evaluating the first combined signal Q1 from the at least two first sensor signals and the second combined signal Q2 from the at least two second sensor signals;

v) determining the at least one position (x1, y1) of the first reflection feature and the at least one position (x2, y2) of the second reflection feature in the reflection image and determining the at least one first vector (x1, y1, z1) of the first reflection feature and the at least one second vector (x2, y2, z2) of the second reflection feature;

vi) determining from the first vector and the second vector the at least one elevation map and determining therefrom the dimensions of the empty storage unit.

The elevation map determined in the empty-calibration step may be used as pre-determined elevation map, as outlined above. Furthermore, the dimensions of the empty storage unit may be used for determining the volume of the filled storage unit.

The empty-calibration step may be performed before method step a). Additionally or alternatively, an elevation map and/or the dimension of types of storage unit may be provided in a data storage of the evaluation device, e.g. in a look-up table of the evaluation device. The empty-calibration step may be performed repeatedly. For example, the empty-calibration step may be performed in case of a exchange of filling level determining device according to the present invention used to determine the filling level. For example, the empty-calibration step may be performed in case of maintenance such as battery change of the filling level determining device.

Preferably, in the empty-calibration step the elevation map may comprise vectors of as many as possible features of the illumination pattern. Most preferably, the elevation map may comprise vectors of all features of the illumination pattern. This may allow reducing inaccuracies during determining filling level of the filled storage unit. The empty-calibration step may comprise adding missing vectors of the illumination pattern by linear interpolation and/or extrapolation.

The method may comprise at least one filled-up-calibration step, wherein in the filled-up-calibration step the storage unit is filled up to at least one pre-defined filling level, which is also denoted 100% filling level, wherein dimensions of the filled up storage unit are determined. The filled-up-calibration step comprises the following substeps:

I) illuminating the filled up storage unit with the at least one illumination pattern comprising the plurality of illumination features and determining the at least one reflection image of the filled up storage unit;

II) selecting the at least one first reflection feature and the at least one second reflection feature of the reflection image;

III) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;

IV) evaluating the two first sensor signals generated in step III) and, thereby, deter-mining the at least one first longitudinal coordinate z1 of the first reflection feature, and evaluating the two second sensor signals generated in step III) and, thereby, determining the at least one second longitudinal coordinate z2 of the second reflection feature, wherein the evaluating comprises evaluating the first combined signal Q1 from the at least two first sensor signals and the second combined signal Q2 from the at least two second sensor signals;

V) determining the at least one position (x1, y1) of the first reflection feature and the at least one position (x2, y2) of the second reflection feature in the reflection image and determining the at least one first vector (x1, y1, z1) of the first reflection feature and the at least one second vector (x2, y2, z2) of the second reflection feature;

VI) determining from the first vector and the second vector the at least one elevation map and determining therefrom the dimensions of the filled up storage unit.

The pre-defined filling level may be an arbitrary filling level and may depend on the type of articles stored in the storage unit. The pre-defined filling level may correspond to a 100% filling level. A 100% filling level may depend on the type of articles stored in the storage unit. Specifically, a filling volume may depend on the type of articles. For example, in case the articles are small and flat washers the surface of the storage unit may be essentially flat. In case the articles are big screws, e.g. M45×160, between the screws hollow space may be present which has to be taken into account by defining the 100% filling level.

The filled-up-calibration step may be performed before method step a). Additionally or alternatively, an elevation map of the filled up storage unit may be provided in a data storage of the evaluation device, e.g. in a look-up table of the evaluation device. The empty-calibration step may be performed repeatedly. For example, the filled-up-calibration step may be performed in case of an exchange of type of articles to be stored in the storage unit.

In a further aspect of the present invention, method for determining an amount of articles, in particular of articles of the same type, in at least one warehouse comprising a plurality of storage units is disclosed. As used herein, the term "warehouse" refers to a spatial configuration comprising at least two storage units. The warehouse may comprise two, three, four or more storage units. The warehouse may be at least one logistics center, at least one distribution center, at least one shop, at least one structural rack; at least one commercial building; at least one self storage warehouse; at least one pallet rack; at least one packing house; at least one fulfillment house; at least one automated storage and retrieval system; at least one store; or the like. The method comprises determining a filling level of each of the storage units using a method for determining a filling level according to the embodiments disclosed above and/or according to one or more of the embodiments disclosed in further detail below.

The method further comprises evaluating the amount of articles from the determined filling levels of the storage units and summing up the amount of articles. The evaluating of the amount of articles may comprise using at least one predetermined relationship between the filling level of the storing unit and the amount of articles stored in a storage unit. The predetermined relationship may be one or more of an empiric relationship, a semi-empiric relationship and an analytically derived relationship. The evaluation device may comprise the at least one data storage unit for storing the predetermined relationship, such as a lookup list or a lookup table. The predetermined relationship may depend on the type of articles.

The method may comprise reporting the determined filling level of the storage unit, in particular of each storage unit, and/or the determined amount of articles in the storage unit, in particular of each storage unit, to at least one merchandise management system which may be adapted to receive and/or to store and/or to evaluate the reported filling level and/or the reported amount of articles. The merchandise management system may comprise at least one computing device. The merchandise management system may comprise at least one display device adapted to display the reported filling level and/or the reported amount of articles and/or the summed amount of articles. As will be outlined in further detail, each of the storage units may comprise at least one filling level determining device. The storage unit and/or the filling level determining device may be adapted to report the determined filling level and/or the determined amount of articles to the merchandise management system. The storage unit and/or the filling level determining device may be adapted to communicate with the merchandise management system. The storage unit may be connected to at least one network such as a communications network, with other devices. The storage unit and/or the filling level determining device may be connected to SAP (Systems, Applications and Products in Data Processing) systems and/or enterprise resource planning (ERP) systems. The storage unit and/or the filling level determining device may be configured to perform automatic inventory, in particular to provide information about the number of articles stored in the storage unit based on the determined filling level, e.g. to the communications network and/or to a further device. The storage unit and/or the filling level determining device may be adapted to perform an automatic refill of storage unit, e.g. by generating and providing a request based on the determined filling level to the communications network and/or to a further device. The storage unit and/or the filling level determining device may be configured to allow billing based on the determined filling level. Specifically, in case of determined access or determined change in filling level the storage unit and/or the filling level determining device may provide information about the determined access or filling level to the communication network and/or to a further device, wherein at least one participant of the communication network and/or the further device may generate a bill based on the information about the access and/or filling level. The storage unit and/or the filling level determining device may be configured to allow or deny access based on orders. The communication may be wireless.

The storage unit and/or the filling level determining device may be low power consumption devices and/or may allow long life time of a power source such as a battery. The storage unit and/or the filling level determining device may comprise low power applications and/or specifications. For example, the storage unit and/or the filling level determining device may comprise at least one microprocessor without an operating system. For example, the storage unit and/or the filling level determining device may comprise at least one low power Asic. For example, the storage unit and/or the filling level determining device may comprise low maintenance. For example, the storage unit and/or the filling level determining device may be run in a power saving mode. In order to save power, the storage unit and/or the filling level determining device may perform a reduced number of measurements, in particular only necessary measurements.

For specific applications, the storage unit and/or the filling level determining device may be configured for dynamic adjustment of a measurement time. For example, in case of automatic refill, which may be triggered in case a pre-specified filling level is reached, the filling level may be determined less frequent if the storage unit is filled, wherein a measurement frequencies may be increased with decreasing filling level. The measurement frequency may depend on consumption pattern and/or on safety to trigger refilling. Between two measurements the storage unit and/or the filling level determining device may be in a sleep-mode. For example, a microcontroller of the filling level determining device may comprise a low-power-mode. For example, the microcontroller of the filling level determining device may be a microcontroller available as Atmel SAMS70N19A. The storage unit and/or the filling level determining device may be activated by a wake-up, such as an electronic signal, and may be used for determining the filling level. The wake-up may be released after a pre-defined time range, e.g. activated by an internal low-power real time clock, or may be activated by an external trigger. Even in an active measurement mode, in which the filling level is determined, the storage unit and/or the filling level determining device may be configured to require only low energy. For example, the storage unit and/or the filling level determining device may comprise processing devices and/or controller may be without an operating system. The determination of the filling level, in particular an algorithm for determining the filling level may be time efficient to allow as little time as possible in an active state. Furthermore, the storage device and/or the filling level determining device may be configured for low energy data communication. Thus, e.g. in case of wireless communication Bluetooth Low Energy, such as standard Bluetooth 4.X, may be used. The storage device and/or the filling level determining device may be configured for establishing communication connections rapidly. The storage device and/or the filling level determining device may be configured for energy efficient data transmission. The storage unit and/or the filling level determining device may be designed without any moving components and consequently require low-maintenance and are less susceptible for disturbances.

In a further aspect of the present invention, a method for determining at least one change of an amount of articles in at least one storage unit is disclosed. The method comprises determining at a first time point an initial filling level of the storage unit using a method for determining a filling level according to the embodiments disclosed above and/or according to one or more of the embodiments disclosed in further detail below. The method comprises determining at a second time point an actual filling level of the storage unit using a method for determining a filling level according to the embodiments disclosed above and/or according to one or more of the embodiments disclosed in further detail below. The first time point and the second time point may be different. For example, the first time point may be at a time point at or shortly after a filling of the storage unit with the articles. The first time point may be a time point of a previous determination of the filling level. The term "initial filling level" refers to the amount of articles at the first time point. The second time point may be a later time point. The term "actual filling level" refers to the amount of articles at the second time point. The determination of the actual filling level may be performed continuously or non-continuously, for example in pre-defined time intervals. The determination of the actual filling level may be determined automatically, for example in pre-defined time intervals. The determination of the actual filling level may be initiated, for example by a user. The method comprises determining a difference between the initial filling level and the actual filling level by comparing the initial filling level and the actual filling level.

The method may comprise determining that an exceptional access has occurred if the difference between the initial filling level and the actual filling level exceeds a pre-defined limit. The pre-defined limit may comprise at least one pre-defined difference limit, such as according to orders of the article stored in the storage unit. The pre-defined limit may depend on the type of articles. The method may comprise generating at least one information about the exceptional access, for example a warning, if an exceptional access is determined. The information about the exceptional access may comprise at least one optical display such as a message and/or at least one acoustic signal. The access may be permitted and/or allowed depending on orders. The access may be permitted and/or allowed temporarily, e.g. for a pre-defined time range.

The method may comprise determining an unauthorized access if the difference between the initial filling level and the actual filling level exceeds the pre-defined limit and an access is non-authorized. The merchandise management system may be adapted to authorize an access. The method may comprise generating at least one information about the unauthorized access if an unauthorized access is determined. The information about the unauthorized access may comprise at least one optical display such as a message and/or at least one acoustic signal.

In a further aspect of the present invention, a filling level determining device for determining a filling level in at least one storage unit is disclosed. As used herein, the term "filling level determining device" refers to a device adapted to determine a filling level. The filling level determining device may be or may comprise a least one filling level sensor.

The filling level determining device may be mounted and/or attached to at least one wall, e.g. of the storage unit and/or of a warehouse. The filling level determining device may be arranged above the storage unit and/or lateral to the storage unit. The filling level determining device may be arranged such that at least one light beam traveling from the storage unit or from an article stored therein to the filling level determining device travels parallel to the optical axis of the filling level determining device. Other embodiments are feasible. For example, the filling level determining device may be adapted to receive and evaluate light beams under arbitrary angles. The filling level determining device may be integrated within the storage unit and/or may be attached to the storage unit by a mounting device, e.g. a fastener such as a screw, an adhesive, or the like, and/or may be arranged independent from the storage unit such as above a conveyor belt or may hang in a silo, or warehouse or the like.

The filling level determining device may comprise one or more motion sensors, and/or one or more motion sensors and/or further sensors selected from the group consisting of: a position sensor; a weight sensor; an inclination sensor; an acceleration sensor; a gravitational sensor; a vibration sensor; a gyroscopic sensor. Other types of motion sensors may be used. As used herein, a motion sensor generally refers to a sensor which is adapted to determine at least one of a position, a velocity, acceleration, and inclination or an orientation of the filling level determining device. As an example, combination with motion sensors may allow measurements in directions other than the optical axis. As an example, measuring a first distance of a first object along the optical axis, measuring an angle of rotation of the filling level determining device by a motion sensor, such as a gyroscope, and measuring a second distance to a second object along the rotated optical axis may allow to determine the distance between the first and the second object by using standard laws of trigonometry.

The filling level determining device is configured to perform a method for determining a filling level according to any one of the preceding embodiments. The filling level determining device may comprise at least one illumination device adapted to generate at least one illumination pattern comprising a plurality of illumination features. The filling level determining device may comprise at least one sensor element adapted to determining at least one reflection image of the storage unit. The filling level determining device may comprise at least one evaluation device adapted to select at least one first reflection feature and at least one second reflection feature of the reflection image. The sensor element may have a matrix of optical sensors. The optical sensors each may have a light-sensitive area. Each optical sensor may be designed to generate at least one sensor signal in response to an illumination of its respective light-sensitive area by a reflection light beam. The sensor element may be adapted to generate for the first reflection feature at least two first sensor signals in response to an illumination of the sensor element by the first reflection feature, and to generate for the second reflection feature at least two second sensor signals in response to an illumination of the sensor element by the second reflection feature. The evaluation device may be adapted to evaluate the two first sensor signals, thereby, determining at least one first longitudinal coordinate z1 of the first reflection feature. The evaluation device may be adapted to evaluate the two second sensor signals, thereby, determining at least one second longitudinal coordinate z2 of the second reflection feature. The evaluating may comprise evaluating a first combined signal Q1 from the at least two first sensor signals and a second combined signal Q2 from the at least two second sensor signals. The evaluation device may be adapted to determine at least one position (x1, y1) of the first reflection feature and at least one position (x2, y2) of the second reflection feature in the reflection image and to determine at least one first vector (x1, y1, z1) of the first reflection feature and at least one second vector (x2, y2, z2) of the second reflection feature. The evaluation device may be adapted to determine from the first vector and the second vector at least one elevation map and to determine therefrom the filling level in the storage unit.

For details, options and definitions, reference may be made to the methods as discussed above. As outlined above, the filling level determining device is adapted to perform a method for determining a filling level according to the embodiments disclosed above and/or according to one or more of the embodiments disclosed in further detail below.

The filling level determining device may comprise at least one optical element selected from the group consisting of: transfer device, such as at least one lens and/or at least one lens system, at least one diffractive optical element. The term "transfer device", also denoted as "transfer system", may generally refer to one or more optical elements which are adapted to modify the light beam, such as by modifying one or more of a beam parameter of the light beam, a width of the light beam or a direction of the light beam. The transfer device may be adapted to guide the light beam onto the optical sensors. The transfer device specifically may comprise one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. As used herein, the term "focal length" of the transfer device refers to a distance over which incident collimated rays which may impinge the transfer device are brought into a "focus" which may also be denoted as "focal point". Thus, the focal length constitutes a measure of an ability of the transfer device to converge an impinging light beam. Thus, the transfer device may comprise one or more imaging elements which can have the effect of a converging lens. By way of example, the transfer device can have one or more lenses, in particular one or more refractive lenses, and/or one or more convex mirrors. In this example, the focal length may be defined as a distance from the center of the thin refractive lens to the principal focal points of the thin lens. For a converging thin refractive lens, such as a convex or biconvex thin lens, the focal length may be considered as being positive and may provide the distance at which a beam of collimated light impinging the thin lens as the transfer device may be focused into a single spot. Additionally, the transfer device may comprise one or a plurality of transfer devices such as lenses which can have the effect of a converging lens. Additionally, the transfer device can comprise at least one wavelength-selective element, for example at least one optical filter. Additionally, the transfer device can be designed to impress a predefined beam profile on the electromagnetic radiation, for example, at the location of the sensor region and in particular the sensor area. The abovementioned optional embodiments of the transfer device can, in principle, be realized individually or in any desired combination.

The transfer device may have an optical axis. In particular, the filling level determining device and the transfer device have a common optical axis. As used herein, the term "optical axis of the transfer device" generally refers to an axis of mirror symmetry or rotational symmetry of the lens or lens system. The optical axis may be a line of symmetry of the optical setup of the filling level determining device. The filling level determining device may comprise at least one transfer device, preferably at least one transfer system having at least one lens. The transfer system, as an example, may comprise at least one beam path, with the elements of the transfer system in the beam path being located in a rotationally symmetrical fashion with respect to the optical axis. Still, one or more optical elements located within the beam path may also be off-centered or tilted with respect to the optical axis. In this case, however, the optical axis may be defined sequentially, such as by interconnecting the centers of the optical elements in the beam path, e.g. by interconnecting the centers of the lenses, wherein, in this context, the optical sensors are not counted as optical elements. The optical axis generally may denote the beam path. Therein, the filling level determining device may have a single beam path along which a light beam may travel from the storage unit to the optical sensors, or may have a plurality of beam paths. As an example, a single beam path may be given or the beam path may be split into two or more partial beam paths. In the latter case, each partial beam path may have its own optical axis. The optical sensors may be located in one and the same beam path or partial beam path. Alternatively, however, the optical sensors may also be located in different partial beam paths. The transfer device may constitute a coordinate system, wherein a longitudinal coordinate is a coordinate along the optical axis and wherein d is a spatial offset from the optical axis. The coordinate system may be a polar coordinate system in which the optical axis of the transfer device forms a z-axis and in which a distance from the z-axis and a polar angle may be used as additional coordinates. A direction parallel or anti-parallel to the z-axis may be considered a longitudinal direction, and a coordinate along the z-axis may be considered a longitudinal coordinate. Any direction perpendicular to the z-axis may be considered a transversal direction, and the polar coordinate and/or the polar angle may be considered a transversal coordinate.

As outlined above, the filling level determining device may further comprise one or more additional elements such as one or more additional optical elements. Further, the filling level determining device may fully or partially be integrated into at least one housing. The evaluation device and the filling level determining device may fully or partially be integrated into a single device. Thus, generally, the evaluation device also may form part of the filling level determining device. Alternatively, the evaluation device and the filling level determining device may fully or partially be embodied as separate devices. The filling level determining device may comprise further components.

The filling level determining device may be a stationary device or a mobile device. Further, the filling level determining device may be a stand-alone device or may form part of another device, such as a computer, or any other device.

The devices according to the present invention may be used in the context of warehouses, logistics, distribution, shipping, loading, packaging, quality control, manufacturing, unloading, smart manufacturing, industry 4.0, or the like. Further, in a manufacturing context, devices according to the present invention may be used in the context of processing, dispensing, bending, packaging, material handling especially of liquids, paints, pellets, pastes, natural products, or the like.

The filling level determining device may comprise at least one power storage, in particular at least one battery. The power storage may be exchangeable and/or rechargeable. The filling level determining device may comprise at least one communication unit adapted to transfer data to at least one further device such as to the merchandise management system. The communication unit may be adapted to receive data from the merchandise management system, such as at least one control signal, for example for controlling the filling level determining device, and/or at least one request, for example for data transfer. The communication unit may be adapted to communicate wirelessly, e.g. by WLAN, radio waves, blue tooth, LiFi or the like, with the merchandise management system.

The evaluation device may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device may comprise one or more measurement devices, such as one or more measurement devices for measuring electrical currents and/or electrical voltages. Further, the evaluation device may comprise one or more data storage units. Further, the evaluation device may comprise one or more interfaces, such as one or more wireless interfaces and/or one or more wire-bound interfaces.

The at least one evaluation device may be adapted to perform at least one computer program, such as at least one computer program adapted for performing or supporting one or more or even all of the method steps of the methods according to the present invention. As an example, one or more algorithms may be implemented which, by using the sensor signals as input variables, may determine the filling level.

The evaluation device can be connected to or may comprise at least one further data processing device that may be used for one or more of displaying, visualizing, analyzing, distributing, communicating or further processing of information, such as information obtained by the optical sensor and/or by the evaluation device. The data processing device, as an example, may be connected or incorporate at least one of a display, a projector, a monitor, an LCD, a TFT, a loudspeaker, a multichannel sound system, an LED pattern, or a further visualization device. It may further be connected or incorporate at least one of a communication device or communication interface, a connector or a port, capable of sending encrypted or unencrypted information using one or more of email, text messages, telephone, Bluetooth, Wi-Fi, LiFi, infrared or internet interfaces, ports or connections. It may further be connected to or incorporate at least one of a processor, a graphics processor, a CPU, an Open Multimedia Applications Platform (OMAP™), an integrated circuit, a system on a chip such as products from the Apple A series or the Samsung S3C2 series, a microcontroller or microprocessor, one or more memory blocks such as ROM, RAM, EEPROM, or flash memory, timing sources such as oscillators or phase-locked loops, counter-timers, real-time timers, or power-on reset generators, voltage regulators, power management circuits, or DMA controllers. Individual units may further be connected by buses such as AMBA buses or be integrated in an Internet of Things or Industry 4.0 type network.

The evaluation device and/or the data processing device may be connected by or have further external interfaces or ports such as one or more of serial or parallel interfaces or ports, USB, Centronics Port, FireWire, HDMI, Ethernet, Bluetooth, RFID, Wi-Fi, LiFi, USART, or SPI, or analogue interfaces or ports such as one or more of ADCs or DACs, or standardized interfaces or ports to further devices such as a 2D-camera device using an RGB-interface such as CameraLink. The evaluation device and/or the data processing device may further be connected by one or more of inter-processor interfaces or ports, FPGA-FPGA-interfaces, or serial or parallel interfaces ports. The evaluation device and the data processing device may further be connected to one or more of an optical disc drive, a CD-RW drive, a DVD+ RW drive, a flash drive, a memory card, a disk drive, a hard disk drive, a solid state disk or a solid state hard disk. The evaluation device and/or the data processing device may be connected by or have one or more further external connectors such as one or more of phone connectors, RCA connectors, VGA connectors, hermaphrodite connectors, USB connectors, HDMI connectors, 8P8C connectors, BCN connectors, IEC 60320 C14 connectors, optical fiber connectors, D-subminiature connectors, RF connectors, coaxial connectors, SCART connectors, XLR connectors, and/or may incorporate at least one suitable socket for one or more of these connectors.

In a further aspect of the present invention, a storage unit for storing an amount of articles is disclosed. The storage unit comprises at least one receptacle adapted to receive and to store the amount of articles. The receptacle may comprise at least one bottom surface or ground surface and at least one side wall adapted to at least partially surround the bottom surface or ground surface. The term "partially surround" refers to that embodiments are possible wherein the side walls of the storage unit are open at at least one side. The storage unit may comprise at least one lid adapted to cover at least partially storage unit. The storage unit may be selected from the group consisting of: at least one container; at least one box; at least one bucket, at least one vessel, at least one barrel, at least one bottle, at least one ampoule, at least one antistatic bag, at least one bag-in-box, at least one cage, at least one flexible bag or bottle, at least one case, at least one carboy, at least one carton, at least one chub, at least one clamshell, at least one crate, at least one cup, at least one envelope, at least one jar, at least one jerrycan, at least one keg, at least one multi-pack, at least one pail, at least one paper or plastic bag, at least one paper sack, at least one retort pouch, at least one Tetra Brik, at least one tub, at least one tube, at least one unit load, at least one vial, at least one wooden box, at least one blister pack, at least one container, at least one pallet, at least one bulk box, at least one pallet box, at least one bin box, at least one intermediate bulk container, at least one flexible intermediate bulk container, at least one intermodal container, at least one drum, at least one cask, at least one can, at least one bag. The storage unit may have an arbitrary shape such as a rectangular, cylindrical, cubic, circular, octagonal, hexagonal shape or the like. The storage unit may be made from or may comprise materials such as wood, plastic, steel, metal, paper, silicon, silicone, fiber, carton, aluminum, iron, glass, metal foil, plastic film, cellophane, bubble wrap, coated paper, fiberboard, nickel, carbon, lead, copper, tungsten, titanium, cardboard, paperboard, magnesium, polymer foam, metallized film, liquid packaging board, concrete, cement, tin, zinc, stretch wrap, tape, molded pulp, fabric, zinc, bricks, plaster, clay, sand, or the like. For example, the storage unit may comprise at least one plastic container. Other shapes and materials are possible. The storage unit may have a size suitable to store a desired amount of articles. The storage unit comprises at least one filling level determining device according to the embodiments disclosed above and/or according to one or more of the embodiments disclosed in further detail below.

In a further aspect of the present invention, a storage management system comprising at least two storage units is disclosed. The storage unit and/or a filling level determining device determining the filling level in the respective storage unit may be connected to a management system adapted to one or more of: monitor filling level in at least one of the storage units; monitor number of products in at least one of the storage units and/or in a warehouse; initiating and/or monitoring refill; monitoring and/permitting access based on orders. The storage management system may comprise at least one interface adapted to communicate with the storage unit and/or the filling level determining device, e.g. to receive data from the storage unit and/or the filling level determining device and/or to transfer data to the storage unit and/or the filling level determining device, and/or with an external device such as an enterprise resource planning (ERP) system.

The proposed devices and methods provide a large number of advantages over known detectors of this kind. Thus, the filling level determining device generally may avoid the shortcomings of the known prior art systems disclosed above. The method for determining a filling level in at least one storage unit may allow consumption-based distribution and storage of articles in a warehouse in real time. Furthermore, value and quantity of articles can be determined at any time. The methods allow determining if an unexpected or unauthorized access to the articles has occurred. In addition, the methods and devices can be used universally, i.e. independent of shape, size, color or properties of the surfaces of stored articles.

Overall, in the context of the present invention, the following embodiments are regarded as preferred:

Embodiment 1: A method for determining a filling level in at least one storage unit comprising the following steps
 a) illuminating the storage unit with at least one illumination pattern comprising a plurality of illumination features and determining at least one reflection image of the storage unit;
 b) selecting at least one first reflection feature and at least one second reflection feature of the reflection image;
 c) for the first reflection feature, generating at least two first sensor signals in response to an illumination of at least one sensor element having a matrix of optical sensors by the first reflection feature, and for the second reflection feature, generating at least two second sensor signals in response to an illumination of the sensor element by the second reflection feature, the optical sensors each having a light-sensitive area;
 d) evaluating the two first sensor signals generated in step c), thereby, determining at least one first longitudinal coordinate z1 of the first reflection feature, and evaluating the two second sensor signals generated in step c), thereby, determining at least one second longitudinal coordinate z2 of the second reflection feature;
 e) determining at least one position (x1, y1) of the first reflection feature and at least one position (x2, y2) of the second reflection feature in the reflection image and determining at least one first vector (x1, y1, z1) of the first reflection feature and at least one second vector (x2, y2, z2) of the second reflection feature;
 f) determining from the first vector and the second vector at least one elevation map and determining therefrom the filling level in the storage unit.

Embodiment 2: The method according to the preceding embodiment, wherein the evaluating comprises evaluating a first combined signal Q1 from the at least two first sensor signals and a second combined signal Q2 from the at least two second sensor signals.

Embodiment 3: The method according to the preceding embodiment, wherein the first combined signal Q1 is derived by one or more of dividing the two first sensor signals, dividing multiples of the two first sensor signals, dividing linear combinations of the two first sensor signals, and wherein the second combined signal Q2 is derived by one or more of dividing the two second sensor signals, dividing multiples of the two second sensor signals, dividing linear combinations of the two second sensor signals.

Embodiment 4: The method according to any one of the two preceding embodiments, wherein the combined signals Qi with i=1, 2 are derived by $$Q_i(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of the respective reflection feature at the position of the sensor element, and $E(x,y,z_O)$ denotes the beam profile given at the distance $z_O$ of the storage unit, wherein each of the sensor signals comprises at least one information of at least one area of the beam profile of the respective reflection feature.

Embodiment 5: The method according to any one of the preceding embodiments, wherein the method comprises determining a first area of the beam profile of the respective reflection feature and a second area of the beam profile of the respective reflection feature, wherein the first area of the beam profile of the respective reflection feature comprises essentially edge information of the beam profile of the respective reflection feature and the second area of the beam profile of the respective reflection feature comprises essentially center information of the beam profile of the respective reflection feature, wherein the edge information comprises information relating to a number of photons in the first area of the beam profile of the respective reflection feature and the center information comprises information relating to a number of photons in the second area of the beam profile of the respective reflection feature.

Embodiment 6: The method according to any one of the four preceding embodiments, wherein the evaluating of the first sensor signals of the first reflection feature and the evaluating of the second sensor signals of the second reflection feature comprises
- determining at least one optical sensor having the highest sensor signal and forming at least one center signal;
- evaluating the sensor signals of the optical sensors of the matrix and forming at least one sum signal;
- determining at least one combined signal by combining the center signal and the sum signal; and
- determining the longitudinal region by evaluating the combined signal.

Embodiment 7: The method according to any one of the five preceding embodiments, wherein at least one first predetermined relationship between the first combined signal Q1 and the first longitudinal coordinate z1 is used for determining the first longitudinal coordinate, and wherein at least one second predetermined relationship between the second combined signal Q2 and the second longitudinal coordinate z2 is used for determining the second longitudinal coordinate.

Embodiment 8: The method according to any one of the preceding embodiments, wherein the method further comprises:
- determining for each of the selected reflection features at least one displacement region corresponding to a longitudinal region in at least one reference image comprising a plurality of reference features, wherein the longitudinal region is given by the longitudinal coordinate z of the respective selected reference feature determined in step c) and an error interval ±ε;
- matching the respective selected reflection feature with at least one reference feature within the displacement region.

Embodiment 9: The method according to the preceding embodiment, wherein a displacement of the matched reference feature and the selected reflection feature is determined, wherein at least one longitudinal information of the matched reference feature is determined using a predetermined relationship between a longitudinal coordinate and the displacement.

Embodiment 10: The method according any one of the two preceding embodiments, wherein the reference image and the reflection image are images of the storage unit determined at different spatial positions, wherein an epipolar line is determined in the reference image, wherein the displacement region extends along the epipolar line, wherein the reference feature corresponding to the respective longitudinal coordinate z of the first or second reflection feature is determined along the epipolar line and an extent of the displacement region along the epipolar line corresponding to the error interval ±ε is determined.

Embodiment 11: The method according any one of the three preceding embodiments, wherein the reference image and the reflection image are images of the storage unit determined at different illumination times and/or at different lighting conditions.

Embodiment 12: The method according to any one of the four preceding embodiments, wherein the respective first and second reflection features are matched with the corresponding reference features within the displacement region by using at least one evaluation algorithm considering the determined longitudinal coordinate z, wherein the evaluation algorithm is a linear scaling algorithm.

Embodiment 13: The method according to any one of the preceding embodiments, wherein the method comprises at least one empty-calibration step, wherein in the empty-calibration step dimensions of the empty storage unit are determined, wherein the empty calibration step comprises the following substeps:
i) Illuminating the empty storage unit with the at least one illumination pattern comprising the plurality of illumination features and determining the at least one reflection image of the empty storage unit;
ii) selecting the at least one first reflection feature and the at least one second reflection feature of the reflection image;
iii) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;
iv) evaluating the two first sensor signals generated in step iii) thereby, determining the at least one first longitudinal coordinate z1 of the first reflection feature, and evaluating the two second sensor signals generated in step iii), thereby, determining the at least one second longitudinal coordinate z2 of the second reflection feature, wherein the evaluating comprises evaluating the first combined signal Q1 from the at least two first sensor signals and the second combined signal Q2 from the at least two second sensor signals;
v) determining the at least one position (x1, y1) of the first reflection feature and the at least one position (x2, y2) of the second reflection feature in the reflection image and determining the at least one first vector (x1, y1, z1) of the first reflection feature and the at least one second vector (x2, y2, z2) of the second reflection feature;
vi) determining from the first vector and the second vector the at least one elevation map and determining therefrom the dimensions of the empty storage unit.

Embodiment 14: The method according to the preceding embodiment, wherein the method comprises estimating a filling level using illumination features additionally or only which are located at a wall such as at a rear wall and/or side wall and/or surface and/or bottom or the like of the storage unit and/or at a further wall that is located in a vicinity of the storage unit during the measurement and which is used specifically for this purpose.

Embodiment 15: The method according to any one of the preceding embodiments, wherein the method comprises at least one filled-up-calibration step, wherein in the filled-up-calibration step the storage unit is filled up to at least one predefined filling level, wherein dimensions of the filled up storage unit are determined, wherein the filled-up-calibration step comprises the following substeps:

I) illuminating the filled up storage unit with the at least one illumination pattern comprising the plurality of illumination features and determining the at least one reflection image of the filled up storage unit;

II) selecting the at least one first reflection feature and the at least one second reflection feature of the reflection image;

III) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;

IV) evaluating the two first sensor signals generated in step III) and, thereby, determining the at least one first longitudinal coordinate z1 of the first reflection feature, and evaluating the two second sensor signals generated in step III) and, thereby, determining the at least one second longitudinal coordinate z2 of the second reflection feature, wherein the evaluating comprises evaluating the first combined signal Q1 from the at least two first sensor signals and the second combined signal Q2 from the at least two second sensor signals;

V) determining the at least one position (x1, y1) of the first reflection feature and the at least one position (x2, y2) of the second reflection feature in the reflection image and determining the at least one first vector (x1, y1, z1) of the first reflection feature and the at least one second vector (x2, y2, z2) of the second reflection feature;

VI) determining from the first vector and the second vector the at least one elevation map and determining therefrom the dimensions of the filled up storage unit.

Embodiment 16: The method according to any one of the preceding embodiments, wherein the method is performed fully automatic.

Embodiment 17: Method for determining an amount of articles, in particular of articles of the same type, in at least one warehouse comprising a plurality of storage units, the method comprises determining a filling level of each of the storage units using a method for determining a filling level according to any one of the preceding embodiments, wherein the method further comprises evaluating the amount of articles from the determined filling levels of the storage units and summing the amount of articles.

Embodiment 18: Method for determining at least one change of an amount of articles in at least one storage unit, the method comprising the following steps:

determining at a first time point an initial filling level of the storage unit using a method for determining a filling level according to any one of the preceding embodiments referring to a method for determining a filling level;

determining at a second time point an actual filling level of the storage unit using a method for determining a filling level according to any one of the preceding embodiments referring to a method for determining a filling level, determining a difference between the initial filling level and the actual filling level by comparing the initial filling level and the actual filling level.

Embodiment 19: The method according to the preceding embodiment, wherein the method comprises determining that an exceptional access has occurred if the difference between the initial filling level and the actual filling level exceeds a pre-defined limit.

Embodiment 20: The method according to the preceding embodiment, wherein the method comprises generating at least one information about the exceptional access if an exceptional access is determined.

Embodiment 21: The method according to any one of the three preceding embodiments, wherein the method comprises determining an unauthorized access if the difference between the initial filling level and the actual filling level exceeds the pre-defined limit and an access is non-authorized, wherein the method comprises generating at least one information about the unauthorized access if an unauthorized access is determined.

Embodiment 22: Filling level determining device for determining a filling level in at least one storage unit, wherein the filling level determining device is configured to perform a method for determining a filling level according to any one of the preceding embodiments referring to a method for determining a filling level.

Embodiment 23: The filling level determining device according to the preceding embodiment, wherein the filling level determining device comprises at least one illumination device adapted to generate at least one illumination pattern comprising a plurality of illumination features, wherein the filling level determining device comprises at least one sensor element adapted to determining at least one reflection image of the storage unit, wherein the filling level determining device comprises at least one evaluation device adapted to select at least one first reflection feature and at least one second reflection feature of the reflection image, wherein the sensor element has a matrix of optical sensors, the optical sensors each having a light-sensitive area, wherein each optical sensor is designed to generate at least one sensor signal in response to an illumination of its respective light-sensitive area by a reflection light beam, wherein the sensor element is adapted to generate for the first reflection feature at least two first sensor signals in response to an illumination of the sensor element by the first reflection feature, and to generate for the second reflection feature at least two second sensor signals in response to an illumination of the sensor element by the second reflection feature, wherein the evaluation device is adapted to evaluate the two first sensor signals, thereby, determining at least one first longitudinal coordinate z1 of the first reflection feature, and to evaluate the two second sensor signals, thereby, determining at least one second longitudinal coordinate z2 of the second reflection feature, wherein the evaluation device is adapted to determine at least one position (x1, y1) of the first reflection feature and at least one position (x2, y2) of the second reflection feature in the reflection image and to determine at least one first vector (x1, y1, z1) of the first reflection feature and at least one second vector (x2, y2, z2) of the second reflection feature, wherein the evaluation device is adapted to determine from the first vector and the second vector at least one elevation map and to determine therefrom the filling level in the storage unit.

Embodiment 24: The filling level determining device according to any one of the preceding embodiments referring to a filling level determining device, wherein the filling level determining device comprises at least one power storage, in particular at least one battery.

Embodiment 25: The filling level determining device according to any one of the preceding embodiments referring to a filling level determining device, wherein the evaluating comprises evaluating a first combined signal Q1 from the at least two first sensor signals and a second combined signal Q2 from the at least two second sensor signals, Embodiment 26: Storage unit for storing an amount of articles, wherein the storage unit comprises at least one receptacle adapted to receive and to store the amount of articles, wherein the storage unit comprises at least one filling level determining device according to any one of the preceding embodiments referring to a filling level determining device.

Embodiment 27: Storage management system comprising at least two storage units, wherein the storage unit are connected to a management system adapted to one or more of: monitor filling level in at least one of the storage units; monitor number of products in at least one of the storage units and/or in a warehouse; initiating and/or monitoring refill; monitoring and/permitting access based on orders.

Embodiment 28: The storage management system according to the preceding embodiment, wherein the storage management system comprises at least one interface adapted to communicate with the storage units and/or with at least one filling level determining device according to any one of the preceding embodiments referring to a filling level determining device and/or with an external device such as an enterprise resource planning (ERP) system.

BRIEF DESCRIPTION OF THE FIGURES

Further optional details and features of the invention are evident from the description of preferred exemplary embodiments which follows in conjunction with the dependent embodiments. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
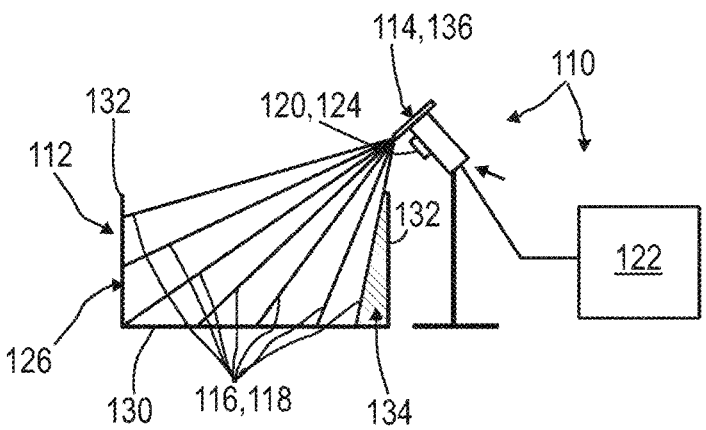
FIG. 1 shows an embodiment of a filling level determining device and storage unit according to the present invention.

FIG. 1 shows in a highly schematic fashion an embodiment of a filling level determining device 110 for determining a filling level in at least one storage unit 112. The filling level determining device 110 comprises at least one illumination device 114 adapted to generate at least one illumination pattern 116 comprising a plurality of illumination features 118. The filling level determining device 110 comprises at least one sensor element 120 adapted to determining at least one reflection image of the storage unit 112. The filling level determining device 110 comprises at least one evaluation device 122 adapted to select at least one first reflection feature and at least one second reflection feature of the reflection image. The sensor element 120 has a matrix of optical sensors 124. The optical sensors 124 each have a light-sensitive area. Each optical sensor 124 is designed to generate at least one sensor signal in response to an illumination of its respective light-sensitive area by a reflection light beam. The sensor element 120 is adapted to generate for the first reflection feature at least two first sensor signals in response to an illumination of the sensor element 120 by the first reflection feature, and to generate for the second reflection feature at least two second sensor signals in response to an illumination of the sensor element 120 by the second reflection feature. The evaluation device 122 is adapted to evaluate the two first sensor signals, thereby, determining at least one first longitudinal coordinate z1 of the first reflection feature, and to evaluate the two second sensor signals, thereby, determining at least one second longitudinal coordinate z2 of the second reflection feature. The evaluating comprises evaluating a first combined signal Q1 from the at least two first sensor signals and a second combined signal Q2 from the at least two second sensor signals. The evaluation device 122 is adapted to determine at least one position (x1, y1) of the first reflection feature and at least one position (x2, y2) of the second reflection feature in the reflection image and to determine at least one first vector (x1, y1, z1) of the first reflection feature and at least one second vector (x2, y2, z2) of the second reflection feature. The evaluation device 122 is adapted to determine from the first vector and the second vector at least one elevation map and to determine therefrom the filling level in the storage unit 112.

Figure 2:
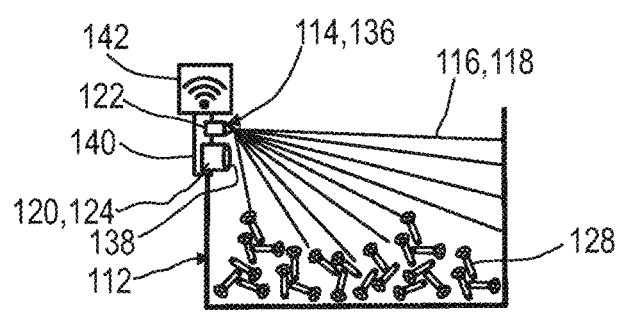
FIG. 2 shows a further embodiment of the filling level determining device and the storage unit according to the present invention.

The storage unit 112 comprises at least one receptacle 126 adapted to receive and to store articles 128, see e.g. FIG. 2. The receptacle 126 may comprise at least one bottom surface 130. The receptacle 126 may comprise at least one side wall 132 adapted to at least partially surround the bottom surface 130. The storage unit 112 may comprise at least one lid adapted to cover at least partially storage unit 112. The storage unit 112 may be selected from the group consisting of: at least one container; at least one box; at least one bucket, at least one vessel, at least one barrel, at least one bottle, at least one ampoule, at least one antistatic bag, at least one bag-in-box, at least one cage, at least one flexible bag or bottle, at least one case, at least one carboy, at least one carton, at least one chub, at least one clamshell, at least one crate, at least one cup, at least one envelope, at least one jar, at least one jerrycan, at least one keg, at least one multi-pack, at least one pail, at least one paper or plastic bag, at least one paper sack, at least one retort pouch, at least one Tetra Brik, at least one tub, at least one tube, at least one unit load, at least one vial, at least one wooden box, at least one blister pack, at least one container, at least one pallet, at least one bulk box, at least one pallet box, at least one bin box, at least one intermediate bulk container, at least one flexible intermediate bulk container, at least one intermodal container, at least one drum, at least one cask, at least one can, at least one bag. The storage unit 112 may have an arbitrary shape such as a rectangular, cubic, circular, octagonal, hexagonal, cylindrical shape or the like. The storage unit 112 may be made from or may comprise materials such as wood, plastic, steel, metal, paper, silicon, silicone, fiber, carton, aluminum, iron, glass, metal foil, plastic film, cellophane, bubble wrap, coated paper, fiberboard, nickel, carbon, lead, copper, tungsten, titanium, cardboard, paperboard, magnesium, polymer foam, metallized film, liquid packaging board, concrete, cement, tin, zinc, stretch wrap, tape, molded pulp, fabric, zinc, bricks, plaster, clay, sand, or the like. For example, the storage unit may comprise at least one plastic container. Other shapes and materials are possible. The storage unit 112 may have a size suitable to store a desired amount of articles.

The illumination device 114 may be arranged such that the storage unit 112 may be maximally illuminated, i.e. that a suitable distribution of features of the illumination pattern 116 is achieved. This may allow to reduce a dead volume 134, i.e. a region which is shadowed due to of the illumination device 114 and the sensor element 120.

The sensor element 120 may be formed as a unitary, single device or as a combination of several devices. The matrix specifically may be or may comprise a rectangular matrix having one or more rows and one or more columns. The rows and columns specifically may be arranged in a rectangular fashion. However, other arrangements are feasible, such as nonrectangular arrangements. As an example, circular arrangements are also feasible, wherein the elements are arranged in concentric circles or ellipses about a center point. For example, the matrix may be a single row of pixels. Other arrangements are feasible.

The optical sensors 124 of the matrix specifically may be equal in one or more of size, sensitivity and other optical, electrical and mechanical properties. The light-sensitive areas of all optical sensors 124 of the matrix specifically may be located in a common plane, the common plane preferably facing the storage unit 112, such that a light beam propagating from the storage unit 112 to the filling level determining device 110 may generate a light spot on the common plane. The light-sensitive area may specifically be located on a surface of the respective optical sensor 124. Other embodiments, however, are feasible. The optical sensors 124 may comprise for example, at least one CCD and/or CMOS device. As an example, the optical sensors 124 may be part of or constitute a pixelated optical device. As an example, the optical sensors may be part of or constitute at least one CCD and/or CMOS device having a matrix of pixels, each pixel forming a light-sensitive area.

The optical sensors 124 specifically may be or may comprise photodetectors, preferably inorganic photodetectors, more preferably inorganic semiconductor photodetectors, most preferably silicon photodetectors. Specifically, the optical sensors 124 may be sensitive in the visible or infrared spectral range. All of the optical sensors 124 of the matrix or at least a group of the optical sensors 124 of the matrix specifically may be identical. Groups of identical optical sensors 124 of the matrix specifically may be provided for different spectral ranges, or all optical sensors may be identical in terms of spectral sensitivity. Further, the optical sensors 124 may be identical in size and/or with regard to their electronic or optoelectronic properties. The matrix may be composed of independent optical sensors 124. Thus, one matrix may be composed of inorganic photodiodes. Alternatively, however, a commercially available matrix may be used, such as one or more of a CCD detector, such as a CCD detector chip, and/or a CMOS detector, such as a CMOS detector chip.

The optical sensors 124 may form a sensor array or may be part of a sensor array, such as the above-mentioned matrix. Thus, as an example, the sensor element 120 may comprise an array of optical sensors 124, such as a rectangular array, having m rows and n columns, with m, n, independently, being positive integers. Preferably, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that 0.3≤m/n≤3, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 500 optical sensors 124, preferably at least 10000 optical sensors 124, more preferably at least 500000 optical sensors 124. The matrix may comprise a number of pixels in a multi-mega pixel range. Other embodiments, however, are feasible.

In the embodiment shown in FIG. 1, the illumination pattern 116 may be generated by the at least one illumination device 114. The illumination pattern 116 may comprise at least one pattern selected from the group consisting of: at least one point pattern, in particular a pseudorandom point pattern; a random point pattern or a quasi random pattern; at least one Sobol pattern; at least one quasiperiodic pattern; at least one pattern comprising at least one pre-known feature at least one regular pattern; at least one triangular pattern; at least one hexagonal pattern; at least one rectangular pattern at least one pattern comprising convex uniform tilings; at least one line pattern comprising at least one line; at least one line pattern comprising at least two lines such as parallel or crossing lines. The illumination device 114 may comprise at least one illumination source 136. Specifically, the illumination source 136 may comprise at least one laser and/or laser source. Various types of lasers may be employed, such as semiconductor lasers, double heterostructure lasers, external cavity lasers, separate confinement heterostructure lasers, quantum cascade lasers, distributed bragg reflector lasers, polariton lasers, hybrid silicon lasers, extended cavity diode lasers, quantum dot lasers, volume Bragg grating lasers, Indium Arsenide lasers, transistor lasers, diode pumped lasers, distributed feedback lasers, quantum well lasers, interband cascade lasers, Gallium Arsenide lasers, semiconductor ring laser, extended cavity diode lasers, or vertical cavity surface-emitting lasers. Additionally or alternatively, non-laser light sources may be used, such as LEDs and/or light bulbs. The illumination device 114 may comprise one or more diffractive optical elements (DOEs) adapted to generate the illumination pattern 116. For example, the illumination device may be adapted to generate and/or to project a cloud of points. The illumination pattern may comprise regular and/or constant and/or periodic pattern such as a triangular pattern, a rectangular pattern, a hexagonal pattern, or a pattern comprising further convex tilings. The illumination pattern 116 may comprise as much as possible features per area. A distance between two features of the illumination pattern and/or an area of the at least one illumination feature may depend on the circle of confusion in the image.

The illumination device 114 may comprise one or more of at least one light projector; at least one digital light processing (DLP) projector, at least one LCoS projector, at least one spatial light modulator; at least one diffractive optical element; at least one array of light emitting diodes; at least one array of laser light sources. The illumination device 114 may comprise at least one light source adapted to generate the illumination pattern directly. For example, the illumination device 114 may comprise at least one laser source. For example, the illumination device 114 may comprise at least one line laser. The line laser may be adapted to send a laser line to the storage unit, for example a horizontal or vertical laser line. The illumination device 114 may comprise a plurality of line lasers. For example, the illumination device 114 may comprise at least two line lasers which may be arranged such that the illumination pattern comprises at least two parallel or crossing lines. The illumination device 114 may comprise the at least one light projector adapted to generate a cloud of points such that the illumination pattern may comprise a plurality of point pattern. The illumination device 114 may comprise at least one mask adapted to generate the illumination pattern from at least one light beam generated by the illumination source.

The illumination device 114, specifically, may be configured for emitting light in the visible or infrared spectral range. It shall be noted, however, that other spectral ranges are feasible, additionally or alternatively. Further, the illumination device 114 specifically may be configured for emitting modulated or non-modulated light. In case a plurality of illumination sources is used, the different illumination sources may have different modulation frequencies which, as outlined in further detail below, later on may be used for distinguishing the light beams. The evaluating of the reflection image and of the sensor signals may be performed using the evaluation device 122. The evaluation device 122 may be configured for evaluating a single light beam or a plurality of light beams. In case a plurality of light beams propagates from the storage unit to the sensor element, means for distinguishing the light beams may be provided. Thus, the light beams may have different spectral properties, and one or more wavelength selective elements may be used for distinguishing the different light beams. Each of the light beams may then be evaluated independently. The wavelength selective elements, as an example, may be or may comprise one or more filters, one or more prisms, one or more gratings, one or more dichroitic mirrors or arbitrary combinations thereof. Further, additionally or alternatively, for distinguishing two or more light beams, the light beams may be modulated in a specific fashion. Thus, as an example, the light beams may be frequency modulated, and the sensor signals may be demodulated in order to distinguish partially the sensor signals originating from the different light beams, in accordance with their demodulation frequencies. These techniques generally are known to the skilled person in the field of high-frequency electronics. Generally, the evaluation device 122 may be configured for distinguishing different light beams having different modulations.

Figure 4:
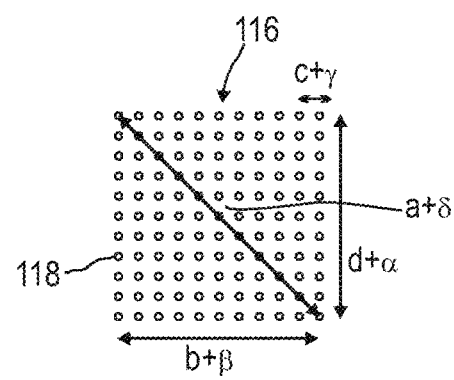
FIG. 4A to C show different embodiments of illumination pattern.
Figure 4:
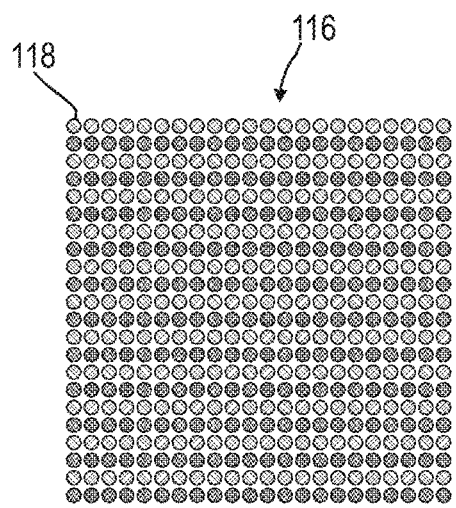
Figure 4:
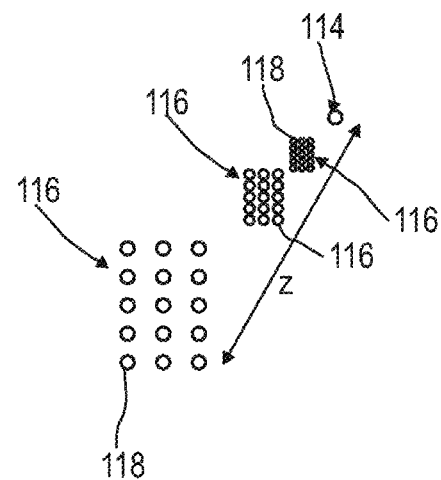

The illumination pattern 116 may depend on the design of the at least one DOE such as geometry and opening angles. FIG. 4A shows an embodiment of an illumination pattern 116 comprising a point pattern. In FIG. 4A, in addition, dependencies of the illumination pattern on the geometry a, b, c, d, opening angles α, β, γ, δ and distance of the DOE are depicted by arrows. For example, the illumination pattern 116 shown FIG. 4A may be generated by at least one laser source having a wavelength of 635 nm, with a power of 30 mW, a circular beam profile and run in a continuous wave mode, and at least one DOE available under model DE-R 258 having a polycarbonate (PC) carrier material, a diameter of 8 mm, a thickness of 1.2 mm and a geometry and opening angle at a distance of 100 mm: a=71 mm, b=50 mm, c=5 mm, d=50 mm, α=39°, β=28°, γ=2.8° and δ=28°. The illumination pattern 116 may comprise 121 points having a diameter of about 4 mm. The diameter of the points depends on the spot size of the laser source. For the DE-R 258 DOE a minimum spot size of 3 mm may be used. The DOE may be configured that the illumination features 118 are distinguishable. In case of enhancing the number or diameter of the illumination feature with identical opening angles of the DOE, the distance between the individual features is reduced such that the measurement coverage in space is reduced. However, enhancing the number or diameter of the illumination features 118 may ensure that smaller articles are met with an illumination feature 118 and can be measured. FIG. 4C visualizes the development of the illumination pattern 116 with increasing distance from the illumination device 114. The illumination device 114 may comprise a plurality of DOEs. This may allow enhancing a high scanning rate. The DOEs may be arranged in a staggered arrangement and/or may be positioned successively. The illumination device 116 may be adapted to generate the illumination pattern 116 with illumination features 118 having different colors. FIG. 4B shows an example of an illumination pattern 116 with illumination features 118 having different colors which was generated by four DOEs. Using different colors may allow enhancing the scanning rate without enhancing the minimum distance required for the measurement.

As shown in FIG. 2, the filling level determining device 110 may comprise at least one transfer device 138 comprising one or more of: at least one lens, for example at least one lens selected from the group consisting of at least one focus-tunable lens, at least one aspheric lens, at least one spheric lens, at least one Fresnel lens; at least one diffractive optical element; at least one concave mirror; at least one beam deflection element, preferably at least one mirror; at least one beam splitting element, preferably at least one of a beam splitting cube or a beam splitting mirror; at least one multi-lens system. In particular, the transfer device 138 may comprise at least one collimating lens.

In the embodiment shown in FIG. 2, the sensor element 120, the illumination device 114 and the evaluation device 122 may by arranged within a housing 140 of the filling level determining device 110. The filling level determining device 110 may comprise at least one power storage, in particular at least one battery. The power storage may be exchangeable and/or rechargeable. The filling level determining device 110 may comprise at least one communication unit 142 adapted to transfer data to at least one further device such as to a merchandise management system. The communication unit 142 may be adapted to receive data from the further device, such as at least one control signal, for example for controlling the filling level determining device 110, and/or at least one request, for example for data transfer. The communication unit 142 may be adapted to communicate wirelessly, e.g. by WLAN, Bluetooth, or LiFi, with the further device.

The evaluation device 122 may be or may comprise one or more integrated circuits, such as one or more application-specific integrated circuits (ASICs), and/or one or more data processing devices, such as one or more computers, preferably one or more microcomputers and/or microcontrollers, Field Programmable Arrays, or Digital Signal Processors. Additional components may be comprised, such as one or more preprocessing devices and/or data acquisition devices, such as one or more devices for receiving and/or preprocessing of the sensor signals, such as one or more AD-converters and/or one or more filters. Further, the evaluation device 122 may comprise one or more measurement devices, such as one or more measurement devices for measuring electrical currents and/or electrical voltages. Further, the evaluation device may comprise one or more data storage units. Further, the evaluation device 122 may comprise one or more interfaces, such as one or more wireless interfaces and/or one or more wire-bound interfaces.

As depicted in FIG. 2, some illumination features 118 impinge on the right wall of the storage unit 112 only. The evaluation device 122 may be adapted to estimating the filling level using illumination features additionally or only which are located at a wall such as at a rear wall and/or side wall and/or surface and/or bottom or the like of the storage unit and/or at a further wall that may be located in the vicinity of the storage unit during the measurement and which may be used specifically for this purpose. Specifically, the wall may be designed as such that reflection features of the illumination pattern are detectable in a reliable way and/or distinguishable in a reliable way from articles in the storage unit. In particular in case of determining the filling level of articles that are difficult to detect, such as low reflecting articles, highly reflecting articles, metallic articles, mixtures of low and highly reflecting articles or the like, which may lead to low back reflection of the illumination pattern 116 and/or to multiple reflections and/or distorted back reflections or the like, using illumination features 118 which are located at a wall such as the rear wall and/or side wall and/or surface and/or bottom or the like of the storage unit and/or at a further wall that may be located in the vicinity of the storage unit during 112 the measurement and which may be used specifically for this purpose may allow determining an estimate of the filling level. The illumination features 118 located at a wall may be calibrated within an empty-calibration step. Using the illumination features 118 located at a wall in combination with the position of the filling level determining device allows determining the volume that is not occupied by articles. In particular, using the position of the filling level determining device in combination with the positions of the reflection features at a wall, further combined with the fact that the at least one light beam of each reflection feature travels on a straight line towards the detector, further combined with a calibration for a 100% filled up storage unit further combined with the knowledge about the direction of gravitational force such as from an accelerometer or the like may be used to determine the empty volume above the at least one light beam travelling from a reflection feature at a wall to the detector. A difference between the calibration for a 100% filled up storage unit with the empty volume of the storage unit may be a good approximation for the filling level of the storage unit. Further, in case positions of reflection features from articles and positions from reflection features from a wall may be determined, the above considerations to estimate the empty volume above a light ray may be used only partially and/or locally, such as only in positions where the determination of a position of a reflection feature was not possible and/or where an outlier as determined. Alternatively or in addition, the empty volume above a light ray may be corrected by the position of a reflection feature of an article determined beneath the same light ray.

Figure 3A:
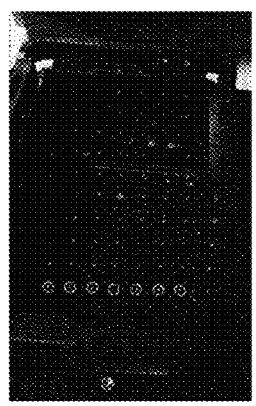
FIGS. 3A and 3B show top views of the illuminated storage unit.
Figure 3B:
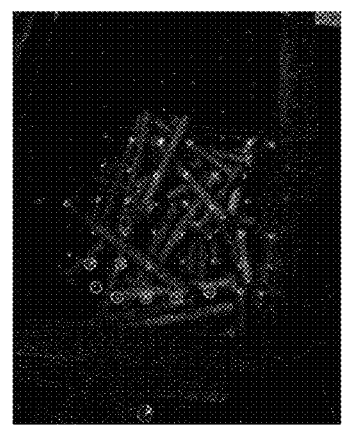

FIGS. 3A and 3B show top views of the storage unit 112 illuminated with the at least one illumination pattern 116. FIG. 3A shows an empty storage unit 112 and FIG. 3B shows the same storage unit 112 filled with screws. The evaluation device 122 is adapted to select at least one reflection feature of the reflection image. The evaluation device 122 may be adapted to perform at least one image analysis and/or image processing in order to identify the reflection feature. The image analysis and/or image processing may use at least one feature detection algorithm. The image analysis and/or image processing may comprise one or more of the following: a filtering; a selection of at least one region of interest; a formation of a difference image between an images created by the reflection pattern at different illumination times; a formation of a difference image between an image created by the reflection pattern and an image created without illumination; a formation of a difference image between an image created by the reflection pattern and an image created with ambient illumination; a formation of a difference image between an image created by the reflection pattern and at least one further image; a formation of a difference image between an image created by the reflection pattern and an image created by the reflection pattern from a further illumination source; a formation of a difference image between an image created by the sensor signals and at least one offset; an inversion of sensor signals by inverting an image created by the sensor signals; a formation of a difference image between images created by the sensor signals at different times; a background correction; a decomposition into color channels; a decomposition into hue; saturation; and brightness channels; a frequency decomposition; a singular value decomposition; applying a blob detector; applying a corner detector; applying a Determinant of Hessian filter; applying a principle curvature-based region detector; applying a maximally stable extremal regions detector; applying a generalized Hough-transformation; applying a ridge detector; applying an affine invariant feature detector; applying an affine-adapted interest point operator; applying a Harris affine region detector; applying a Hessian affine region detector; applying a scale-invariant feature transform; applying a scale-space extrema detector; applying a local feature detector; applying speeded up robust features algorithm; applying a gradient location and orientation histogram algorithm; applying a histogram of oriented gradients descriptor; applying a Deriche edge detector; applying a differential edge detector; applying a spatio-temporal interest point detector; applying a Moravec corner detector; applying a Canny edge detector; applying a Laplacian of Gaussian filter; applying a Difference of Gaussian filter; applying a Sobel operator; applying a Laplace operator; applying a Scharr operator; applying a Prewitt operator; applying a Roberts operator; applying a Kirsch operator; applying a high-pass filter; applying a blob analysis; applying an edge filter; applying a low-pass filter; applying a Fourier transformation; applying a Radon-transformation; applying a Hough-transformation; applying a wavelet-transformation; a thresholding; creating a binary image. At least one region of interest may be determined manually by a user or may be determined automatically, such as by recognizing a feature within an image generated by the optical sensors 124.

The storage unit 112, in particular articles 128, may emit and/or reflect at least one light beam of the illumination pattern 116. The sensor element 120 and/or at least one additional imaging device may determine the reflection image. The reflection image may comprise the at least one reflection pattern comprising the at least one reflection feature.

As outlined above, the evaluation device 122 is adapted to evaluate the two first sensor signals, and thereby, at least one first longitudinal coordinate z1 of the first reflection feature is determined. In addition, the evaluation device 122 is adapted to evaluate the two second sensor signals and thereby, at least one second longitudinal coordinate z2 of the second reflection feature is determined. Thus, the evaluation device 122 may be adapted to determine the longitudinal coordinate of the respective reflection feature and/or to pre-classify the first reflection feature and the second reflection feature of the reflection image.

The evaluating comprises evaluating a first combined signal Q1 from the at least two first sensor signals and a second combined signal Q2 from the at least two second sensor signals. The evaluation device 122 may be configured for determining at least one longitudinal region of the selected reflection features by evaluating a combined signal Q from the sensor signals. The evaluation device 122 may be adapted to determine the first longitudinal coordinate z1 and the second longitudinal coordinate z2 of the respective selected reflection feature by evaluating the combined signals Q1 and Q2. The evaluation device 122 may be adapted to determine the first longitudinal coordinate z1 within an error interval $\pm\varepsilon 1$ and the second longitudinal coordinate z2 within an error interval $\pm\varepsilon 2$. Errors e1 and E2 may depend on measurement uncertainty of the optical sensor. For example, the error interval may be $\pm 10\%$, preferably $\pm 5\%$, more preferably $\pm 1\%$.

The evaluation device 122 may be configured for deriving the combined signal Q by one or more of dividing the sensor signals, dividing multiples of the sensor signals, dividing linear combinations of the sensor signals. The first combined signal Q1 may be derived by one or more of dividing the two first sensor signals, dividing multiples of the two first sensor signals, dividing linear combinations of the two first sensor signals. The second combined signal Q2 may be derived by one or more of dividing the two second sensor signals, dividing multiples of the two second sensor signals, dividing linear combinations of the two second sensor signals. The evaluation device 122 may be configured for using at least one predetermined relationship between the combined signal Q and the longitudinal region for determining the longitudinal region. At least one first predetermined relationship between the first combined signal Q1 and the first longitudinal coordinate z1 may be used for determining the first longitudinal coordinate, and at least one second predetermined relationship between the second combined signal Q2 and the second longitudinal coordinate z2 may be used for determining the second longitudinal coordinate. The first predetermined relationship and the second predetermined relationship may be identical. The evaluation device 122 may be configured for using at least one predetermined relationship between the combined signals Q1 and Q2 and the longitudinal coordinate of the respective longitudinal coordinates z1 and z2. The predetermined relationship may be one or more of an empiric relationship, a semi-empiric relationship and an analytically derived relationship. The evaluation device 122 may comprise at least one data storage unit for storing the predetermined relationship, such as a lookup list or a lookup table.

The combined signals Q1 and Q2 may be determined by using various means. As an example, a software means for deriving a quotient signal, a hardware means for deriving the quotient signal, or both, may be used and may be implemented in the evaluation device. Thus, the evaluation device 122, as an example, may comprise at least one divider, wherein the divider is configured for deriving the quotient signal. The divider may fully or partially be embodied as one or both of a software divider or a hardware divider. The divider may fully or partially be integrated into the sensor element 120 or may fully or partially be embodied independent from the sensor element 120.

For example, the combined signals Qi, with i=1, 2, are derived by $$Q_i(z_O) = \frac{\iint_{A_1} E(x, y; z_O) dx dy}{\iint_{A_2} E(x, y; z_O) dx dy}$$

wherein x and y are transversal coordinates, A1 and A2 are different areas of at least one beam profile of the respective reflection feature at the position of the sensor element 120, and E(x,y,zo) denotes the beam profile given at the distance zo of the storage unit 112. Area A1 and area A2 may differ. In particular, A1 and A2 are not congruent. Thus, A1 and A2 may differ in one or more of the shape or content. Each of the sensor signals may comprises at least one information of at least one area of the beam profile of the respective reflection feature. The beam profile may be a transverse intensity profile of the light beam. The beam profile may be a cross section of the light beam. The beam profile may be selected from the group consisting of a trapezoid beam profile; a triangle beam profile; a conical beam profile and a linear combination of Gaussian beam profiles. Generally the beam profile is dependent on luminance L(zo) and beam shape S(x,y; zo), E(x,y; zo)=L·S. Thus, by deriving the combined signal it may allow determining the longitudinal coordinate independent from luminance. In addition, using the combined signal allows determination of the distance zo independent from an object size. Thus, the combined signal allows determination of the distance zo independent from the material properties and/or reflective properties and/or scattering properties of the object to be measured and independent from alterations of the light source such as by manufacturing precision, heat, water, dirt, damages on the lens, or the like.

Each of the first sensor signals may comprise at least one information of at least one area of the beam profile of the first reflection feature. Each of the second sensor signals may comprise at least one information of at least one area of the beam profile of the second reflection feature. The light-sensitive areas may be arranged such that one of the first sensor signals comprises information of a first area of the beam profile of the first reflection feature and the other one of the first sensor signals comprises information of a second area of the beam profile of the first reflection feature. The first area of the beam profile of the first reflection feature and the second area of the beam profile of the first reflection feature may be one or both of adjacent or overlapping regions. The light-sensitive areas may be arranged such that one of the second sensor signals comprises information of a first area of the beam profile of the second reflection feature and the other one of the second sensor signals comprises information of a second area of the beam profile of the second reflection feature. The second area of the beam profile of the second reflection feature and the second area of the beam profile of the second reflection feature may be one or both of adjacent or overlapping regions. The first area of the respective beam profile and the second area of the respective beam profile may be not congruent in area. The evaluation device 122 may be adapted to determine a first area of the beam profile of the respective reflection feature, in particular a first area of the beam profile of the first reflection feature and a first area of the beam profile of the second reflection feature. The evaluation device 122 may be adapted to determine a second area of the beam profile of the respective reflection feature, in particular a second area of the beam profile of the first reflection feature and a second area of the beam profile of the second reflection feature. The first area of the beam profile of the respective reflection feature may comprise essentially edge information of the beam profile of the respective reflection feature and the second area of the beam profile of the respective reflection feature may comprise essentially center information of the beam profile of the respective reflection feature. The edge information may comprise information relating to a number of photons in the first area of the beam profile of the respective reflection feature and the center information comprises information relating to a number of photons in the second area of the beam profile of the respective reflection feature. The evaluation device 122 may be configured to determine and/or to select the first area of the respective beam profile and the second area of the respective beam profile. The beam profiles of the first reflection feature and of the second reflection feature may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A2 and the second area of the beam profile may be area A1.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device 122 may be adapted for determining an area integral of the beam profile. The evaluation device 122 may be adapted to determine the edge information by integrating and/or summing of the first area. The evaluation device 122 may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device 122 may be adapted to determine one or both of center information or edge information from at least one slice or cut of the light spot. This may be realized, for example, by replacing the area integrals in the combined signal Q by a line integral along the slice or cut. For improved accuracy, several slices or cuts through the light spot may be used and averaged. In case of an elliptical spot profile, averaging over several slices or cuts may result in improved distance information.

The evaluation device 122 may be configured to derive the combined signals Q1 and Q2 by one or more of dividing the respective edge information and the respective center information, dividing multiples of the respective edge information and the respective center information, dividing linear combinations of the respective edge information and the respective center information. Thus, essentially, photon ratios may be used as the physical basis of the method. For example, the reflection pattern may comprise at least one point pattern. The point pattern may comprise at least two feature points. A1 may correspond to an area with a full radius of a point of the point pattern on the optical sensors. A2 may be a central area of the point in the point pattern on the optical sensors. The central area may be a constant value. The central area may have a radius compared to the full radius. For example, the central area may have a radius from 0.1 to 0.9 times the full radius, preferably from 0.4 to 0.6 times the full radius.

For example, the evaluation device 122 may be configured for evaluating the first sensor signals and the second sensor signals each, by a) determining at least one optical sensor 124 having the highest sensor signal and forming at least one center signal;
b) evaluating the sensor signals of the optical sensors 124 of the matrix and forming at least one sum signal;
c) determining at least one combined signal by combining the center signal and the sum signal; and
d) determining the at least one longitudinal coordinate z of the selected feature by evaluating the combined signal.

The determination of the center signal may be performed electronically, since a comparison of sensor signals is fairly simply implemented by conventional electronics, or may be performed fully or partially by software. The detection of the center of the light spot, i.e. the detection of the center signal and/or of the at least one optical sensor from which the center signal arises, may be performed fully or partially electronically or fully or partially by using one or more software algorithms. Specifically, the evaluation device 122 may comprise at least one center detector for detecting the at least one highest sensor signal and/or for forming the center signal. The center detector specifically may fully or partially be embodied in software and/or may fully or partially be embodied in hardware. The center detector may fully or partially be integrated into the at least one sensor element and/or may fully or partially be embodied independently from the sensor element.

Specifically, the center signal may be selected from the group consisting of: the highest sensor signal; an average of a group of sensor signals being within a predetermined range of tolerance from the highest sensor signal; an average of sensor signals from a group of optical sensors containing the optical sensor 124 having the highest sensor signal and a predetermined group of neighboring optical sensors 124; a sum of sensor signals from a group of optical sensors 124 containing the optical sensor 124 having the highest sensor signal and a predetermined group of neighboring optical sensors 124; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors 124 containing the optical sensor 124 having the highest sensor signal and a predetermined group of neighboring optical sensors; an integral of a group of sensor signals being within a predetermined range of tolerance from the highest sensor signal; an integral of a group of sensor signals being above a predetermined threshold.

For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors 124 of the matrix. When adding up, integrating over or averaging over the sensor signals, the actual optical sensors 124 from which the sensor signal is generated may be left out of the adding, integration or averaging or, alternatively, may be included into the adding, integration or averaging. The evaluation device 122 may be adapted to determine the sum signal by integrating signals of the entire matrix, or of the region of interest within the matrix. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

The sum signal may be derived from all sensor signals of the matrix, from the sensor signals within a region of interest or from one of these possibilities with the sensor signals arising from the optical sensors 124 contributing to the center signal excluded. In every case, a reliable sum signal may be generated which may be compared with the center signal reliably, in order to determine the longitudinal coordinate. Generally, the sum signal may be selected from the group consisting of: an average over all sensor signals of the matrix; a sum of all sensor signals of the matrix; an integral of all sensor signals of the matrix; an average over all sensor signals of the matrix except for sensor signals from those optical sensors 124 contributing to the center signal; a sum of all sensor signals of the matrix except for sensor signals from those optical sensors 124 contributing to the center signal; an integral of all sensor signals of the matrix except for sensor signals from those optical sensors 124 contributing to the center signal; a sum of sensor signals of optical sensors 124 within a predetermined range from the optical sensor having the highest sensor signal; an integral of sensor signals of optical sensors within a predetermined range from the optical sensor 124 having the highest sensor signal; a sum of sensor signals above a certain threshold of optical sensors being located within a predetermined range from the optical sensor 124 having the highest sensor signal; an integral of sensor signals above a certain threshold of optical sensors 124 being located within a predetermined range from the optical sensor 124 having the highest sensor signal. Other options, however, exist. The summing may be performed fully or partially in software and/or may be performed fully or partially in hardware. A summing is generally possible by purely electronic means which, typically, may easily be implemented into the filling level determining device. Thus, in the art of electronics, summing devices are generally known for summing two or more electrical signals, both analogue signals and digital signals. Thus, the evaluation device 122 may comprise at least one summing device for forming the sum signal. The summing device may fully or partially be integrated into the sensor element or may fully or partially be embodied independently from the sensor element. The summing device may fully or partially be embodied in one or both of hardware or software.

The combined signal may be a signal which is generated by combining the center signal and the sum signal. Specifically, the combination may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal may comprise an arbitrary signal or signal combination which contains at least one item of information on a comparison between the center signal and the sum signal.

The comparison between the center signal and the sum signal specifically may be performed by forming one or more quotient signals. Thus, generally, the combined signal may be a quotient signal Q, derived by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa; forming a quotient of the center signal and a linear combination of the sum signal and the center signal or vice versa; forming a quotient of the sum signal and a linear combination of the sum signal and the center signal or vice versa; forming a quotient of an exponentiation of the center signal and an exponentiation of the sum signal or vice versa. Other options, however, exist. The evaluation device 122 may be configured for forming the one or more quotient signals. The evaluation device 122 may further be configured for determining the at least one longitudinal coordinate by evaluating the at least one quotient signal.

The evaluation device 122 specifically may be configured for using at least one predetermined relationship between the combined signal Q and the longitudinal coordinate, in order to determine the at least one longitudinal coordinate. Thus, due to the reasons disclosed above and due to the dependency of the properties of the light spot on the longitudinal coordinate, the combined signal Q typically is a monotonous function of the longitudinal coordinate and/or of the size of the light spot such as the diameter or equivalent diameter of the light spot. Thus, as an example, specifically in case linear optical sensors are used, a simple quotient of the sensor signal $s_{center}$ and the sum signal $s_{sum}$ $Q=s_{center}/s_{sum}$ may be a monotonously decreasing function of the distance. Without wishing to be bound by this theory, it is believed that this is due to the fact that, in the preferred setup described above, both the center signal $s_{center}$ and the sum signal $s_{sum}$ decrease as a square function with increasing distance to the light source, since the amount of light reaching the sensor element 120 decreases. Therein, however, the center signal $s_{center}$ decreases more rapidly than the sum signal $s_{sum}$, since, in the optical setup as used in the experiments, the light spot in the image plane grows and, thus, is spread over a larger area. The quotient of the center signal and the sum signal, thus, continuously decreases with increasing diameter of the light beam or diameter of the light spot on the light-sensitive areas of the optical sensors of the matrix. The quotient, further, is typically independent from the total power of the light beam, since the total power of the light beam forms a factor both in the center signal and in the sum sensor signal. Consequently, the combined signal Q may form a secondary signal which provides a unique and unambiguous relationship between the center signal and the sum signal and the size or diameter of the light beam. Since, on the other hand, the size or diameter of the light beam is dependent on a distance between the storage unit, from which the light beam propagates towards the sensor element, and the detector itself, i.e. dependent on the longitudinal coordinate, a unique and unambiguous relationship between the center signal and the sum signal on the one hand and the longitudinal coordinate on the other hand may exist. For the latter, reference e.g. may be made to one or more of the above-mentioned prior art documents, such as WO 2014/097181 A1. The predetermined relationship may be determined by analytical considerations, such as by assuming a linear combination of Gaussian light beams, by empirical measurements, such as measurements measuring the combined signal and/or the center signal and the sum signal or secondary signals derived thereof as a function of the longitudinal coordinate of the object, or both.

The evaluation device 122 may be configured for using at least one predetermined relationship between the combined signal and the longitudinal coordinate. The predetermined relationship may be one or more of an empiric relationship, a semi-empiric relationship and an analytically derived relationship. The evaluation device 122 may comprise at least one data storage unit for storing the predetermined relationship, such as a lookup list or a lookup table.

The evaluation device 122 may further comprise determining at least one distance information of the respective location of reflection of the respective illumination feature by using triangulation and/or structured light techniques. In known 3D sensing devices, such as devices using triangulation or structured light techniques, due to correspondence problems regular, constant or periodic pattern are not suitable since each measured point has to be assigned to one reference point of a reference pattern. As outlined above, the evaluation device 122 may be adapted to determine the first longitudinal coordinate z1 within an error interval $\pm\varepsilon 1$ and the second longitudinal coordinate z2 within an error interval $\pm\varepsilon 2$. The triangulation and/or structured light techniques may allow improving the determined longitudinal coordinates z1 and z2, in particular accuracy, by determining the at least one distance information of the respective location of reflection of the respective illumination feature by using triangulation and/or structured light techniques.

The evaluation device 122 may be adapted to determine for each of the selected reflection features at least one displacement region corresponding to a longitudinal region in at least one reference image comprising a plurality of reference features. The longitudinal region is given by the longitudinal coordinate z of the respective selected reference feature and an error interval $\pm\varepsilon$. The evaluation device may be adapted to match the respective selected reflection feature with at least one reference feature within the displacement region. For example, the reference image may be an image of the illumination pattern at an image plane at a position of the illumination source. The reference image may be determined by one or more of recording at least one reference feature, imaging the at least one reference feature, calculating of the reference image. The reference image and the reflection image may be images of the storage unit 112 determined at different spatial positions having a fixed distance. The distance may be a relative distance, also called baseline. The evaluation device 122 may be adapted to determine the at least one reference feature in the at least one reference image corresponding to the at least one reflection feature. As outlined above, the evaluation device 122 may be adapted to perform an image analysis and to identify features of the reflection image. The evaluation device 122 may be adapted to identify at least one reference feature in the reference image having an essentially identical longitudinal coordinate as the selected reflection feature. For description of epipolar geometry reference is made, for example, to chapter 2 in X. Jiang, H. Bunke: "Dreidimensionales Computersehen" Springer, Berlin Heidelberg, 1997. Epipolar geometry may assume that the reference image and the reflection image may be images of the storage unit determined at different spatial positions and/or spatial orientations having a fixed distance. The evaluation device 122 may be adapted to determine an epipolar line in the reference image. Relative position of the reference image and reflection image may be known. For example, relative position of the reference image and reflection image may be stored within at least one storage unit of the evaluation device. The evaluation device 122 may be adapted to determine a straight line extending from the selected reflection feature of the reflection image. The straight line may comprise possible features corresponding to the selected feature. The straight line and the baseline span an epipolar plane. As the reference image is determined at a different relative position from the reflection image, the corresponding possible features may be imaged on a straight line, called epipolar line, in the reference image. Thus, a feature of the reference image corresponding to the selected feature of the reflection image lies on the epipolar line.

Depending on the distance to the location of the reflection of the illumination feature, the reference feature corresponding to the image position of the reflection feature may be displaced within the reference image compared to the image position in the reflection image. The displacement region may comprise only one reference feature. The displacement region may extend along the epipolar line. The evaluation device 122 may be adapted to determine the respective reference feature along the epipolar line corresponding to the longitudinal coordinate z and to determine an extent of the displacement region along the epipolar line corresponding to the error interval $\pm\varepsilon$. The evaluation device 122 may be adapted to determine the respective longitudinal coordinate z for the reflection feature and an error interval $\pm\varepsilon$ from the combined signal Q to determine the displacement region along the epipolar line corresponding to z±ε. The evaluation device 122 may be adapted to match the selected reflection feature with at least one reference feature within the displacement region. The evaluation device 122 may be adapted to match the selected feature of the reflection image with the reference feature within the displacement region by using at least one evaluation algorithm considering the determined longitudinal coordinate z. The evaluation algorithm may be a linear scaling algorithm. Preferably, the evaluation device 122 may be adapted to pre-classify the selected reflection feature using the combined signal Q such that an unambiguous assignment to one reference feature is possible. In particular, illumination features 118 of the illumination pattern 116 may be arranged such that corresponding reference features of the reference image may have a relative distance to each other as large as possible on the epipolar line. The illumination features 118 may be arranged such that only few reference features are positioned on the epipolar line.

Furthermore, a displacement of the matched reference feature and the selected reflection feature may be determined. At least one longitudinal information of the matched reference feature may be determined using a predetermined relationship between a longitudinal coordinate and the displacement. The evaluation device 122 may be adapted to determine the displacement of the matched reference feature and the selected reflection feature. The evaluation device 122 may be adapted to determine a longitudinal information of the matched feature using a predetermined relationship between a longitudinal coordinate and the displacement. The evaluation device 122 may be adapted to determine the pre-determined relationship by using triangulation methods. In case position of the selected reflection feature in the reflection image and position of the matched reference feature and/or relative displacement of the selected reflection feature and the matched reference feature are known, the longitudinal coordinate of the corresponding location of reflection of the illumination feature may be determined by triangulation. Thus, the evaluation device 122 may be adapted to select, for example subsequent and/or column by column, a reflection feature and to determine for each potential position of the reference feature the corresponding distance value using triangulation. Displacement and corresponding distance value may be stored in at least one storage unit of the evaluation device. The evaluation device 122 may, as an example, comprise at least one data processing device, such as at least one processor, at least one DSP, at least one FPGA and/or at least one ASIC. Further, for storing the at least one predetermined or determinable relationship between the longitudinal coordinate z and the displacement, the at least one data storage unit may be provided, such as for providing one or more look-up tables for storing the predetermined relationship.

Using the combined sensor signal may allow to determine and/or to estimate distances, such as the longitudinal coordinate z within the error interval. By determining the displacement region corresponding to the estimated longitudinal coordinate and the corresponding error interval allows to reduce the possible number of solutions along the epipolar line significantly. The number of possible solutions may even be reduced to one. Determining of the longitudinal coordinate z and the error interval may be performed during a pre-evaluation before matching the selected reflection feature and reference feature. This may allow reducing the computational demand such that it is possible to significantly reduce costs and to allow a use in mobile device or outdoor devices. Furthermore, generally in triangulation systems the baseline has to be large in order to detect large distances. Pre-evaluation of the longitudinal coordinate z and error interval using the combined sensor signal and subsequent matching of the selected reflection feature and reference feature may allow using short baselines such that it may be possible to provide a compact device. Furthermore, pre-evaluation of the longitudinal coordinate z and error interval using the combined sensor signal and subsequent matching of the selected reflection feature and reference feature may enhance accuracy in comparison to conventional triangulation systems. Further, the number of illumination features such as the number of illumination points in the illumination pattern may be reduced to increase the light intensity in each illumination point such as to compete with ambient light while complying to eye safety regulations. A reduced number of illumination features in a conventional triangulation system might increase the difficulty to match reflection features and reference features. Further, the number of illumination features such as the number of illumination points in the illumination pattern may be increased, such as to increase the resolution of the distance measurement, such as to increase the resolution of the obtained depth map without increasing the processing power of the evaluation device such as in a mobile application.

Figure 5:
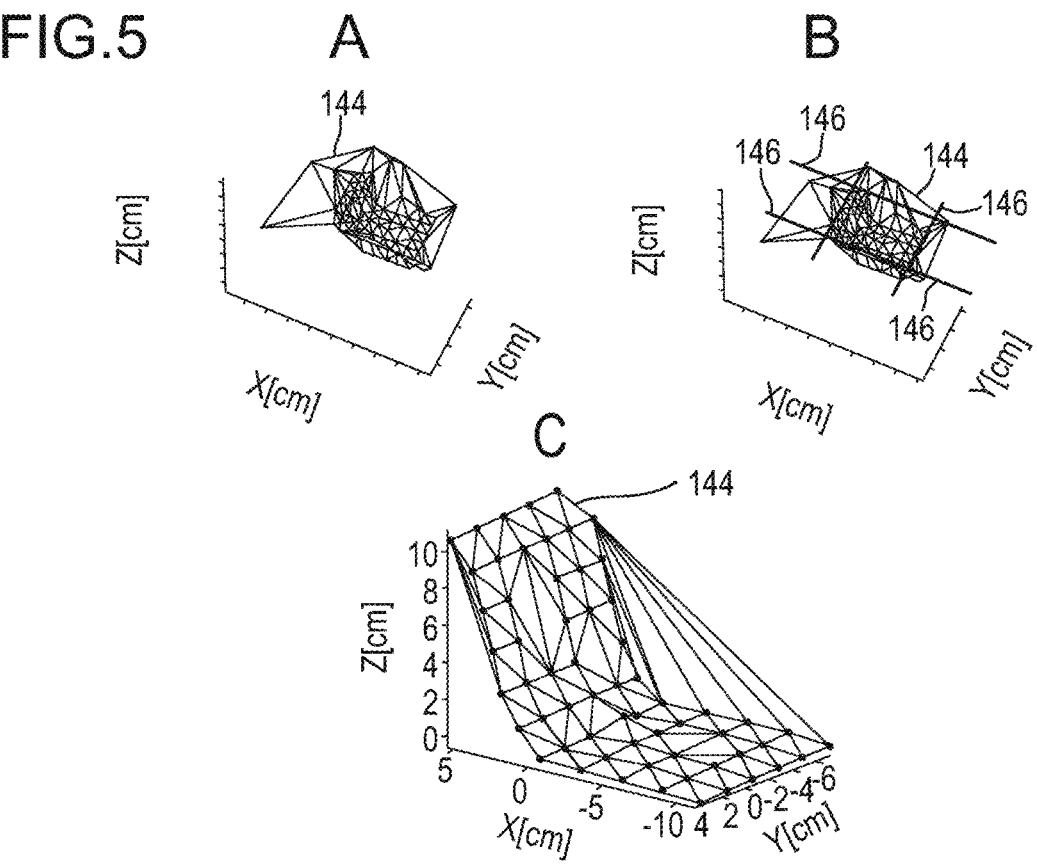
FIG. 5A to C show a determined elevation map (FIG. 5A), removing of features outside the storage unit (FIG. 5B) and resulting elevation map (FIG. 5C)

The evaluation device 122 is adapted to determine at least one position (x1, y1) of the first reflection feature and at least one position (x2, y2) of the second reflection feature in the reflection image. The evaluation device 122 is adapted to determine at least one first vector (x1, y1, z1) of the first reflection feature and at least one second vector (x2, y2, z2) of the second reflection feature. The reflection image may be determined by the sensor element and/or by the at least one additional imaging device. The transversal coordinates x and y may be determined from the position of the respective light spot, in particular of the center signal, in the matrix of optical sensors 120. The evaluation device 122 is adapted to determine from the first vector and the second vector at least one elevation map and determining therefrom the filling level in the storage unit. FIG. 5A shows a determined exemplary elevation map. The evaluation device 122 may be adapted to apply at least one grid 144 to the elevation map. The evaluation device 122 may be adapted to identifying three dimensional points in the evaluation map which appear to be located outside the storage unit 112, in particular due to measurement inaccuracies. FIG. 5B shows limits 146 which surround a region which is considered to be in the storage unit 112. The evaluation device 122 may be adapted to remove all of the three dimensional points from the elevation map which are determined to be located outside the storage unit 112. The resulting elevation map is shown in FIG. 5C.

Figure 6:
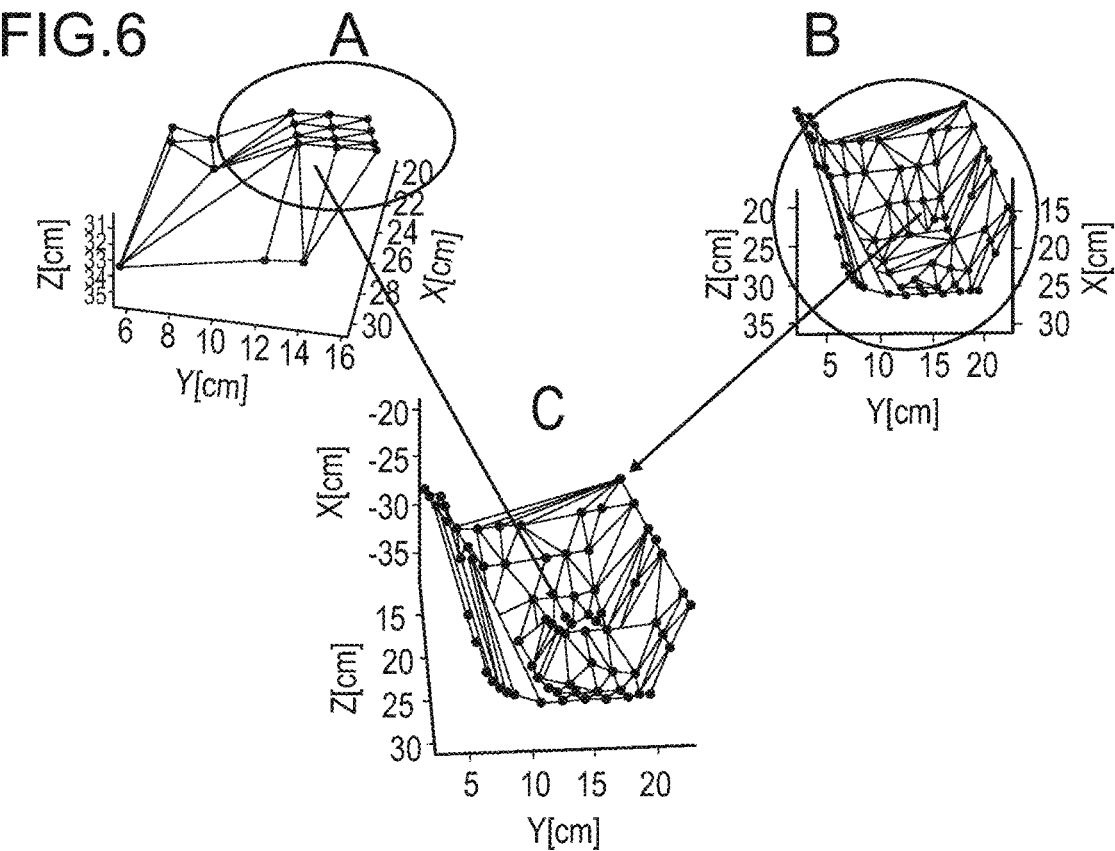
FIG. 6A to C show two elevation maps determined with different illumination times (FIGS. 6A and 6B) and a combined elevation map.

The evaluation device 122 may be adapted to determine a plurality of reflection images and the respective elevation maps of the storage unit 112 during a measurement interval. The measurement interval may comprise a plurality of illumination times. This may allow enhancing reliability of assigning the vector to the respective reflection feature even in presence of reflections, scratches or contamination of the storage unit. Illumination times may be from 0.1 ms to 150 ms. The illumination times may be about 0.1 ms or more for surfaces which are bright reflecting and up to 150 ms for matt surfaces or black objects. In case of repeating determining the elevation map determined vectors of the features of the reflection images may be stored in an array. The evaluation device 122 may be adapted to remove, in a next step, features having the same coordinates may be removed from the array. In particular, coordinates (x, y, z) of each of the features of the array may be compared to coordinates of all other features of the array. If in the array a further feature is found with the same, within a given tolerance such as of ±2 mm, (x, y, z) coordinates this further feature is removed from the array. Alternatively from removing multiple features, a mean or median value of the coordinates of multiple features may be determined. FIGS. 6A and 6B show elevation maps of a storage unit filled with packaging material, in particular paper, determined with an illumination time of 5 ms, in FIG. 6A, and of 100 ms, in FIG. 6B. FIG. 6C shows a combined elevation map of the elevation maps of FIGS. 6A and B, wherein for the combination the highlighted parts of the elevation maps were used.

The evaluation device 122 may be adapted to compare the elevation map with at least one predetermined elevation map, in particular of the empty storage unit 112 or of a filled up storage unit 112. The elevation map of the empty storage unit 112 may be determined using at least one empty-calibration step. In the empty-calibration step dimensions of the empty storage unit 112 are determined. The empty calibration step may comprise the following substeps:

i) Illuminating the empty storage unit 112 with the at least one illumination pattern 116 comprising the plurality of illumination features 116 and determining the at least one reflection image of the empty storage unit 112;

ii) selecting the at least one first reflection feature and the at least one second reflection feature of the reflection image;

iii) for the first reflection feature, generating the at least two first sensor signals in response to an illumination of the at least one sensor element 120 by the first reflection feature, and for the second reflection feature, generating the at least two second sensor signals in response to an illumination of the sensor element 120 by the second reflection feature;

iv) evaluating the two first sensor signals generated in step iii) thereby, determining the at least one first longitudinal coordinate z1 of the first reflection feature, and evaluating the two second sensor signals generated in step iii), thereby, determining the at least one second longitudinal coordinate z2 of the second reflection feature, wherein the evaluating comprises evaluating the first combined signal Q1 from the at least two first sensor signals and the second combined signal Q2 from the at least two second sensor signals;

v) determining the at least one position (x1, y1) of the first reflection feature and the at least one position (x2, y2) of the second reflection feature in the reflection image and determining the at least one first vector (x1, y1, z1) of the first reflection feature and the at least one second vector (x2, y2, z2) of the second reflection feature;

vi) determining from the first vector and the second vector the at least one elevation map and determining therefrom the dimensions of the empty storage unit 112.

The elevation map determined in the empty-calibration step may be used as pre-determined elevation map, as outlined above. Furthermore, the dimensions of the empty storage unit 112 may be used for determining the volume of the filled storage unit 112.

The empty-calibration step may be performed before a filling measurement. Additionally or alternatively, an elevation map and/or the dimension of types of storage unit 112 may be provided in a data storage of the evaluation device 122, e.g. in a look-up table of the evaluation device. The empty-calibration step may be performed repeatedly. For example, the empty-calibration step may be performed in case of an exchange of filling level determining device 110. For example, the empty-calibration step may be performed in case of maintenance such as battery change of the filling level determining device 110.

Figure 7:
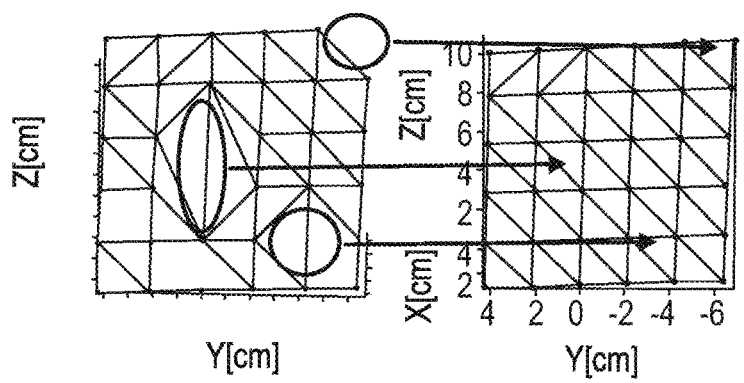
FIGS. 7A and B show determination of elevation map of an empty storage unit.

Preferably, in the empty-calibration step the elevation map may comprise vectors of as many as possible features of the illumination pattern 116. Most preferably, the elevation map may comprise vectors of all features of the illumination pattern 116. This may allow reducing inaccuracies during determining filling level of the filled storage unit 112. The empty-calibration step may comprise adding missing vectors of the illumination pattern 116 by linear interpolation and/or extrapolation. FIG. 7A shows an exemplary determined elevation map of the empty storage unit 112. In FIG. 7A missing vectors are highlighted. FIG. 7B shows the elevation map, wherein the missing vectors were added by linear interpolation and/or extrapolation.

Figure 8:
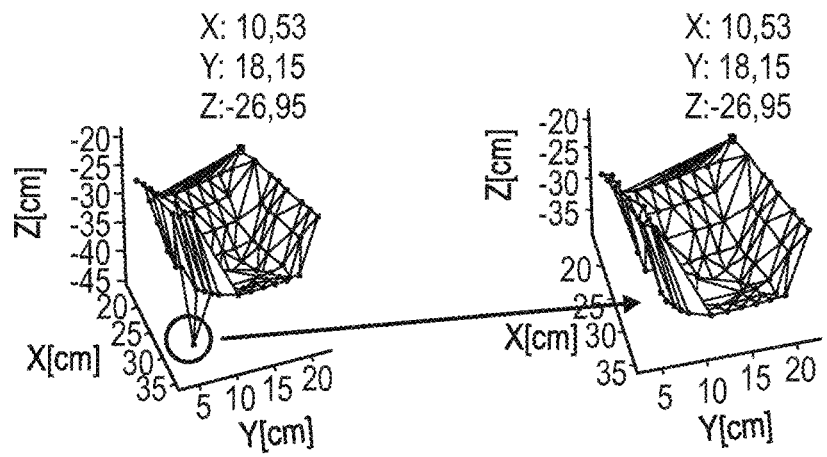
FIGS. 8A and 8B show determined elevation map of a storage unit filled with screws (FIG. 8A) and removing of outliers (FIG. 8B)

The evaluation device 122 may be adapted to smooth the elevation map. The evaluation device 122 may be adapted to smooth outliers with at least one median filter. However, in case of using an illumination pattern comprising only a few illumination features no information redundancy is low. Thus, in the smoothing step at least one algorithm may be used which examines if a reflection feature is an outlier considering neighboring reflection features in a 3D-E-region. If the examined reflection feature is determined to be an outlier the reflection feature may be reconstructed from a median value and/or mean value of the neighboring reflection features. FIG. 8A shows a determined elevation map of a storage unit 112 filed with galvanized hexagon screw M10 determined with an illumination time of 100 ms. One outlier was identified at X=10.53, Y=18.15 and Z=−26.95. FIG. 8B shows the smoothed elevation map.

Figure 9:
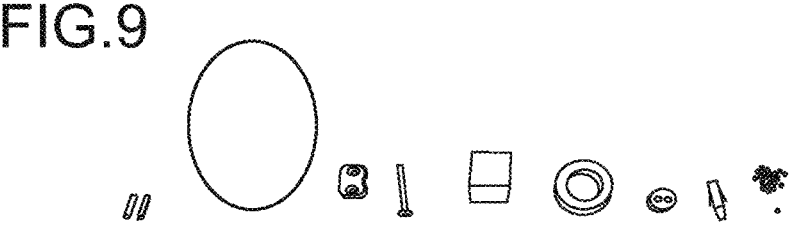
FIG. 9 shows embodiments of articles.

FIG. 9 shows exemplary articles which may be stored in the storage unit 112. For example, from left to right: wooden pens, O-ring (rubber), black plastic holder, countersunk screws M8 long, packed material (paper), O-rings (steel), cover flap black, dowels, oily circlips, holder white.

The evaluation device 122 may be adapted to determine a difference in particular the height difference, between the elevation map and the pre-determined elevation map. The evaluation device 122 may be adapted to compare the three-dimensional vectors of each of the reflection features, which was determined to be located in the storage unit 112, with the corresponding vector of the pre-determined elevation map. In particular, the first vector (x1, y1, z1) is compared to the vector ($x_{ref}$, $y_{ref}$, $z_{ref}$) of the pre-determined elevation map. In particular, a difference vector (x1, y1, z1)−($x_{ref}$, $y_{ref}$, $z_{ref}$) may be determined, wherein a height, in particular a height difference, is determined by |(x1, y1, z1)−($x_{ref}$, $y_{ref}$, $z_{ref}$)|. The absolute value of the difference vector corresponds to the height used for the elevation map, specifically, if the detector receives light under an angle or for arbitrary coordinate systems. Therein, $x_{ref}$, $y_{ref}$, and $z_{ref}$ are transversal and the longitudinal coordinate at the position (x1, y1) of the pre-determined elevation map. The elevation map and/or the height difference map may be filtered before or after the comparison to a further map, such as with a median filter as explained above or below. The method may comprise determining an actual filling level from the height difference $z1-z_{ref}$ by determining a volume, in particular a volume relative to a pre-determined volume. The volume may be determined by determining an integral of the enclosed area of the height difference. For example, in case of many measurement points are available on the surface and/or the bottom or ground, areas between the measurement points may be interpolated. The areas may be even triangles. However, the measurement points may be interpolated using other even and/or continuous areas. The volume may be determined by determining a volume between surface and bottom or ground. For example, in case a single measurement point is available, a surface may be assumed or estimated, for example a flat and/or continuous and/or even and/or horizontal surface. The volume may be determined by determining a volume under the assumed or estimated surface, e.g. from an edge to the bottom or ground. For example, in case of a plurality of measurement points are available, an area around each measurement point e.g. a horizontal and/or flat and/or continuous and/or even area may be determined. For example, the area surrounding a measurement point may be determined and partitioned using a tessellation procedure such as Thiessen polygones, Voronoi tessalations, Dirichlet tessalations, or the like. For example, edges of the areas of neighboring measurement points may intersect and/or cut an interconnecting line between measurement points, e.g. in a center of the points. The areas determined by the tessellation procedure may be set parallel to the surface of the empty storage unit, or may be approximated as such that a smooth transition between two adjacent areas is obtained, or the like. Once the area around a measurement point is determined, the volume connected to the measurement point is given as the volume integral below the area.

The pre-determined elevation map may be the elevation map of the empty storage unit or of the filled up storage unit, in particular 100% filled up storage unit. In particular, the determined elevation map may be compared to an elevation map of a 100% filled up storage unit and at least one percentage filling level may be determined. Thus, the determined elevation map may be compared to a 0% or a 100% filled storage unit.

Figure 10A:
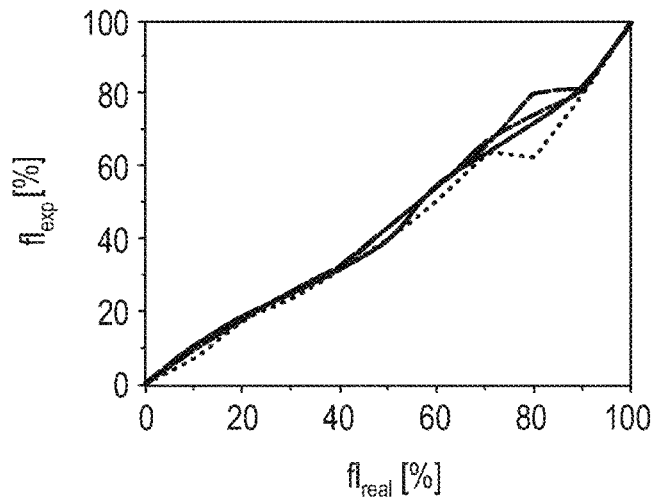
FIG. 10A to C show experimental results of determining the filling level using a method according to the present invention.
Figure 10B:
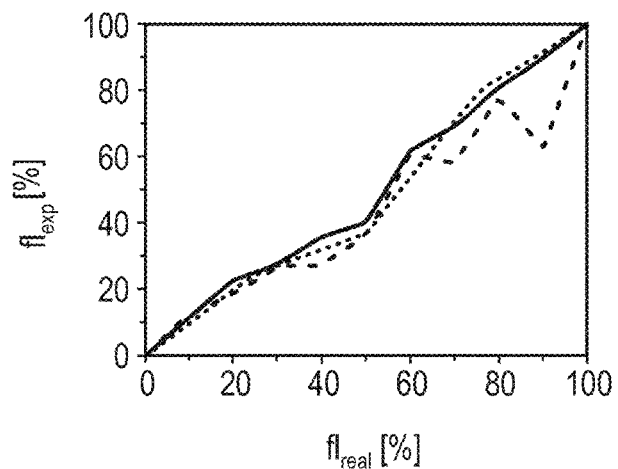
Figure 10C:
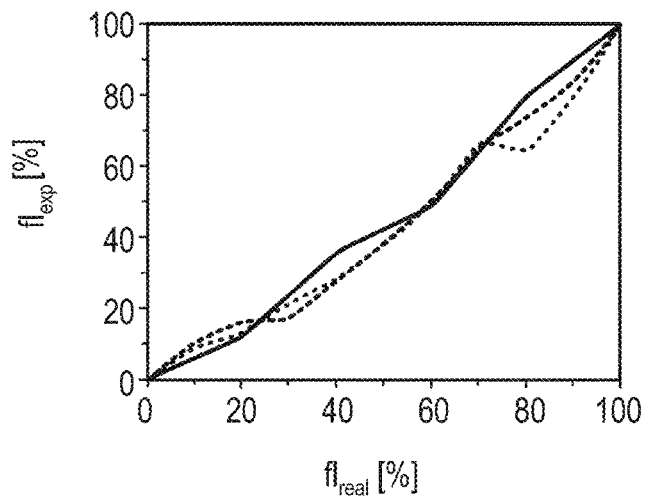

FIG. 10 A to D show exemplary results of determination of a filling level using the filling level determining device 110 and the method for determining a filling level according to the present invention. As experimental setup a sensor element with a camera with a resolution of 13 Megapixels, a sensor size of about 15 mm², an F-number of 2.0 and a focal length of 28 mm was used. Furthermore, a laser source having a wavelength of 635 nm, with a continuous wave power of 30 mW, wherein e.g. in case of a pattern comprising 121 points average power of one point may be 0.25 mW, a circular beam profile and run in a continuous wave mode, and at least one DOE available under model DE-R 258 having a polycarbonate (PC) carrier material, a diameter of 8 mm, a thickness of 1.2 mm and a geometry and opening angle at a distance of 100 mm: a=71 mm, b=50 mm, c=5 mm, d=50 mm, α=39°, β=28°, γ=2.8° and δ=28° was used.

FIG. 10 A shows the determined filling level $fl_{exp}$ in % as a function of the real filling level $fl_{real}$ in %, which was determined by weighing, for wooden pens with an illumination time of 1 ms (full line), red dowels with an illumination time of 5 ms (dashed line), black cover flap (dotted line) and white holder (dashed dotted line). FIG. 10 B shows the determined filling level $fl_{exp}$ in % as a function of the real filling level $fl_{real}$ in %, which was determined by weighing, for oily circlips (full line), O-ring, in particular steel, (dashed line) and for packed material, in particular paper, (dotted line). FIG. 10 C shows the determined filling level $fl_{exp}$ in % as a function of the real filling level $fl_{real}$ in %, which was determined by weighing, for O-ring, in particular rubber, (full line), black plastic holder (dashed line) and countersunk screws M8 long (dotted line).

LIST OF REFERENCE NUMBERS 110 filling level determining device
112 storage unit
114 illumination device
116 illumination pattern
118 illumination feature
120 sensor element
122 evaluation device
124 optical sensor
126 receptacle
128 articles
130 bottom surface
132 side walls
134 dead volume
136 illumination source
138 transfer device
140 housing
142 communication unit
144 grid

CITED DOCUMENTS

WO2012/019734
US2012/0314059A1
WO 2012/110924 A1
WO 2014/097181 A1
WO 2014/198629 A1
R. A. Street (Ed.): Technology and Applications of Amorphous Silicon, Springer-Verlag Heidelberg, 2010, pp. 346-349 X. Jiang, H. Bunke: "Dreidimensionales Computersehen" Springer, Berlin Heidelberg, 1997, chapter 2

The invention claimed is:

1. A method for determining a filling level in at least one storage unit, the method comprising:
    a) illuminating a storage unit with at least one illumination pattern comprising a plurality of illumination features and determining at least one reflection image of the storage unit;
    b) selecting at least one first reflection feature and at least one second reflection feature of the at least one reflection image;
    c) for the at least one first reflection feature, generating at least two first sensor signals in response to an illumination of at least one sensor element having a matrix of optical sensors by the at least one first reflection feature, and for the at least one second reflection feature, generating at least two second sensor signals in response to an illumination of the at least one sensor element by the at least one second reflection feature, the matrix of optical sensors each having a light-sensitive area;
    d) evaluating the at least two first sensor signals generated in step c), thereby, determining at least one first longitudinal coordinate of the at least one first reflection feature, and evaluating the at least two second sensor signals generated in step c), thereby, determining at least one second longitudinal coordinate of the at least one second reflection feature,
    e) determining at least one position of the at least one first reflection feature and at least one position of the at least one second reflection feature in the at least one reflection image and determining at least one first vector of the at least one first reflection feature and at least one second vector of the at least one second reflection feature; and
    f) determining from the at least one first vector and the at least one second vector at least one elevation map and determining therefrom the filling level in the at least one storage unit.

2. The method according to claim 1, wherein evaluating comprises evaluating a first combined signal from the at least two first sensor signals and a second combined signal from the at least two second sensor signals.

3. The method according to claim 2, wherein the first combined signal is derived by one or more of dividing the at least two first sensor signals, dividing multiples of the at least two first sensor signals, dividing linear combinations of the at least two first sensor signals, and wherein the second combined signal is derived by one or more of dividing the at least two second sensor signals, dividing multiples of the at least two second sensor signals, dividing linear combinations of the at least two second sensor signals.

4. The method according to claim 2, wherein combined signals Qi with i=1,2 are derived by $$Q_i(z_O) = \frac{\int\int_{A_1} E(x, y; z_O) dx dy}{\int\int_{A_2} E(x, y; z_O) dx dy}$$

wherein x and y are transversal coordinates, A1 and A2 are different areas of at least one beam profile of a respective reflection feature at a position of the at least one sensor element, and $E(x,y,z_o)$ denotes the at least one beam profile given at a distance $z_o$ of the storage unit, wherein each senor signal comprises at least one information of at least one area of the at least one beam profile of a respective reflection feature.

5. The method according to claim 2, wherein at least one first predetermined relationship between the first combined signal and the first longitudinal coordinate is used for determining the first longitudinal coordinate, and wherein at least one second predetermined relationship between the second combined signal and the second longitudinal coordinate is used for determining the second longitudinal coordinate.

6. The method according to claim 1, wherein the method further comprises:
determining a first area of at least one beam profile of a respective reflection feature and a second area of the at least one beam profile of the respective reflection feature,
wherein the first area of the at least one beam profile of the respective reflection feature comprises essentially edge information of the at least one beam profile of the respective reflection feature and the second area of the at least one beam profile of the respective reflection feature comprises essentially center information of the at least one beam profile of the respective reflection feature, and
wherein the edge information comprises information relating to a number of photons in the first area of the at least one beam profile of the respective reflection feature and the center information comprises information relating to a number of photons in the second area of the at least one beam profile of the respective reflection feature.

7. The method according to claim 1, wherein the evaluating of the at least two first sensor signals of the at least one first reflection feature and the evaluating of the at least two second sensor signals of the at least one second reflection feature comprises:
determining at least one optical sensor having a highest sensor signal and forming at least one center signal;
evaluating sensor signals of the optical sensors of the matrix and forming at least one sum signal;
determining at least one combined signal by combining the at least one center signal and the at least one sum signal; and
determining a longitudinal region by evaluating the at least one combined signal.

8. The method according to claim 1, wherein the method further comprises:
determining for each the selected reflection features at least one displacement region corresponding to a longitudinal region in at least one reference image comprising a plurality of reference features, wherein the longitudinal region is given by a longitudinal coordinate of a respective selected reference feature determined in step c) and an error interval ±ε; and
matching respective selected reflection feature with at least one reference feature within the at least one displacement region.

9. The method according to claim 8, wherein a displacement of matched reference feature and the respective selected reflection feature is determined, wherein at least one longitudinal information of the matched reference feature is determined using a predetermined relationship between a longitudinal coordinate and the displacement.

10. The method according to claim 8, wherein the reference image and the reflection image are images of the storage unit determined at different spatial positions, wherein an epipolar line is determined in the reference image, wherein the at least one displacement region extends along the epipolar line, wherein the reference feature corresponding to a respective longitudinal coordinate of the first or second reflection feature is determined along the epipolar line and an extent of the at least one displacement region along the epipolar line corresponding to an error interval ±ε is determined.

11. The method according to claim 8, wherein the respective first and second reflection features are matched with corresponding reference features within the at least one displacement region by using at least one evaluation algorithm considering the longitudinal coordinate, wherein the evaluation algorithm is a linear scaling algorithm.

12. The method according to claim 1, wherein the method further comprises at least one empty-calibration step, wherein in the at least one empty-calibration step dimensions of an empty storage unit are determined, wherein the at least one empty-calibration step comprises:
i) illuminating the empty storage unit with the at least one illumination pattern comprising the plurality of illumination features and determining the at least one reflection image of the empty storage unit;
ii) selecting the at least one first reflection feature and the at least one second reflection feature of the reflection image;
iii) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;
iv) evaluating the two first sensor signals generated in step iii) thereby, determining the at least one first longitudinal coordinate of the first reflection feature, and evaluating the two second sensor signals generated in step iii), thereby, determining the at least one second longitudinal coordinate of the second reflection feature, wherein the evaluating comprises evaluating the first combined signal from the at least two first sensor signals and the second combined signal from the at least two second sensor signals;

v) determining the at least one position of the first reflection feature and the at least one position of the second reflection feature in the reflection image and determining the at least one first vector of the first reflection feature and the at least one second vector of the second reflection feature; and vi) determining from the first vector and the second vector the at least one elevation map and determining therefrom dimensions of the empty storage unit.

13. The method according to claim 1, wherein the method further comprises at least one filled-up-calibration step, wherein in the filled-up-calibration step the storage unit is filled up to at least one predefined filling level, wherein dimensions of the filled up storage unit are determined, wherein the filled-up-calibration step comprises:

I) illuminating the filled up storage unit with the at least one illumination pattern comprising the plurality of illumination features and determining the at least one reflection image of the filled up storage unit;

II) selecting the at least one first reflection feature and the at least one second reflection feature of the reflection image;

III) for the first reflection feature, generating the at least two first sensor signals in response to an illumination of the at least one sensor element by the first reflection feature, and for the second reflection feature, generating the at least two second sensor signals in response to an illumination of the sensor element by the second reflection feature;

IV) evaluating the two first sensor signals generated in step III) and, thereby, determining the at least one first longitudinal coordinate of the first reflection feature, and evaluating the two second sensor signals generated in step III) and, thereby, determining the at least one second longitudinal coordinate of the second reflection feature, wherein the evaluating comprises evaluating the first combined signal from the at least two first sensor signals and the second combined signal from the at least two second sensor signals;

V) determining the at least one position of the first reflection feature and the at least one position of the second reflection feature in the reflection image and determining the at least one first vector of the first reflection feature and the at least one second vector of the second reflection feature; and VI) determining from the first vector and the second vector the at least one elevation map and determining therefrom the dimensions of the filled up storage unit.

14. Method for determining an amount of articles, the method comprising:

determining a filling level of each of the storage units using a method for determining a filling level according to claim 1, wherein the method further comprises evaluating the amount of articles from the determined filling levels of the storage units and summing the amount of articles.

15. A method for determining at least one change of an amount of articles in at least one storage unit, the method comprising the:

determining at a first time point an initial filling level of the storage unit using a method for determining a filling level according to claim 1 referring to a method for determining a filling level;

determining at a second time point an actual filling level of the storage unit using the method for determining the filling level, and determining a difference between the initial filling level and the actual filling level by comparing the initial filling level and the actual filling level.

16. The method according to claim 15, wherein the method further comprises determining that an exceptional access has occurred if the difference between the initial filling level and the actual filling level exceeds a pre-defined limit.

17. The method according to claim 16, wherein the method further comprises generating at least one information about the exceptional access if an exceptional access is determined.

18. The method according to claim 15, wherein the method further comprises determining an unauthorized access if the difference between the initial filling level and the actual filling level exceeds a pre-defined limit and an access is non-authorized, wherein the method comprises generating at least one information about the unauthorized access if an unauthorized access is determined.

19. Filling level determining device for determining a filling level in at least one storage unit, wherein the filling level determining device is configured to perform a method for determining a filling level according to claim 1.

20. The filling level determining device according to claim 19, wherein the filling level determining device comprises at least one illumination device adapted to generate at least one illumination pattern comprising a plurality of illumination features, wherein the filling level determining device comprises at least one sensor element adapted to determining at least one reflection image of the storage unit, wherein the filling level determining device comprises at least one evaluation device adapted to select at least one first reflection feature and at least one second reflection feature of the reflection image, wherein the sensor element has a matrix of optical sensors, the optical sensors each having a light-sensitive area, wherein each optical sensor is designed to generate at least one sensor signal in response to an illumination of its respective light-sensitive area by a reflection light beam, wherein the sensor element is adapted to generate for the at least one first reflection feature at least two first sensor signals in response to an illumination of the sensor element by the first reflection feature, and to generate for the at least one second reflection feature at least two second sensor signals in response to an illumination of the sensor element by the second reflection feature, wherein the evaluation device is adapted to evaluate the two first sensor signals, thereby, determining at least one first longitudinal coordinate of the first reflection feature, and to evaluate the two second sensor signals, thereby, determining at least one second longitudinal coordinate of the second reflection feature, wherein the evaluation device is adapted to determine at least one position of the first reflection feature and at least one position, of the second reflection feature in the reflection image and to determine at least one first vector of the first reflection feature and at least one second vector of the second reflection feature, wherein the evaluation device is adapted to determine from the at least one first vector and the at least one second vector at least one elevation map and to determine therefrom the filling level in the storage unit.

21. The filling level determining device according to claim 19, wherein the evaluating comprises evaluating a first combined signal from the at least two first sensor signals and a second combined signal from the at least two second sensor signals.

22. A storage unit for storing an amount of articles, wherein the storage unit comprises at least one receptacle adapted to receive and to store the amount of articles, wherein the storage unit comprises at least one filling level determining device according to claim 19.

\* \* \* \* \*